United States Patent
Katsuragawa et al.

(10) Patent No.: US 7,485,041 B2
(45) Date of Patent: Feb. 3, 2009

(54) PROGRAM FOR PROJECTING AN IMAGE ONTO A CHARACTER IN A GAME, GAME MACHINE INCORPORATING THE PROGRAM, AND STORAGE MEDIUM HAVING THE PROGRAM STORED THEREON

(75) Inventors: Shoji Katsuragawa, Tokyo (JP); Tetsuya Kaku, Tokyo (JP); Kazunori Oyama, Tokyo (JP); Yoshinori Suzuki, Tokyo (JP)

(73) Assignee: Sega Corporation, Tokyo (JP)

( * ) Notice: Subject to any disclaimer, the term of this patent is extended or adjusted under 35 U.S.C. 154(b) by 511 days.

(21) Appl. No.: 10/760,482

(22) Filed: Jan. 21, 2004

(65) Prior Publication Data

US 2005/0119049 A1      Jun. 2, 2005

(30) Foreign Application Priority Data

Jan. 24, 2003 (JP) .............................. 2003-016638
Jan. 20, 2004 (JP) .............................. 2004-011280

(51) Int. Cl.
*G06F 17/00* (2006.01)
*G06F 19/00* (2006.01)

(52) U.S. Cl. .............................. 463/34; 463/30; 463/31; 463/32; 463/33; 345/428; 345/582; 382/164; 382/174; 382/285

(58) Field of Classification Search ............. 463/30–34; 345/428, 582; 382/164, 174, 285
See application file for complete search history.

(56) References Cited

U.S. PATENT DOCUMENTS

| | | | | | |
|---|---|---|---|---|---|
| 5,577,960 | A | * | 11/1996 | Sasaki | 463/32 |
| 5,651,104 | A | * | 7/1997 | Cosman | 345/428 |
| 5,687,307 | A | * | 11/1997 | Akisada et al. | 345/428 |
| 6,256,040 | B1 | * | 7/2001 | Tanaka et al. | 345/421 |
| 6,738,061 | B2 | * | 5/2004 | Suzuki | 345/422 |
| 6,816,164 | B2 | * | 11/2004 | Takata | 345/552 |
| 6,831,656 | B2 | * | 12/2004 | Kitao | 345/582 |
| 6,856,321 | B2 | * | 2/2005 | Tsukizaki et al. | 345/582 |
| 6,887,157 | B2 | * | 5/2005 | LeMay et al. | 463/32 |
| 6,924,815 | B2 | * | 8/2005 | Akazawa et al. | 345/582 |
| 2003/0112233 | A1 | * | 6/2003 | Miida et al. | 345/419 |

FOREIGN PATENT DOCUMENTS

JP          2003067767 A    *    3/2003

\* cited by examiner

*Primary Examiner*—Robert Pezzuto
*Assistant Examiner*—Milap Shah
(74) *Attorney, Agent, or Firm*—Dickstein Shapiro LLP.

(57) ABSTRACT

A program for pasting a predetermined image onto a character of a game in a game machine. The program enables a user to create an image consisting of two-dimensional coordinates and to arrange the image created. The program includes the ability to project the image onto a character, at arbitrary positions, in the vicinity of the character in a three-dimensional virtual space, and for pasting on the character a projected image created by projecting the image onto the character from the projection light source.

15 Claims, 21 Drawing Sheets

OPERATION METHOD

TILT THE STICK TO RIGHT OR LEFT TO ROTATE HORIZONTALLY.

TILT THE STICK UPWARD OR DOWNWARD TO ROTATE VERTICALLY.

TILT THE C STICK TO RIGHT OR LEFT TO MOVE THE VIEWPOINT TO RIGHT AND LEFT.

TILT THE C STICK TO UPWARD OR DOWNWARD TO MOVE THE VIEWPOINT TO UPWARD OR DOWNWARD.

A BUTTON: FOR DETERMINATION
B BUTTON: FOR CANCELLATION

OPERATION METHOD

TILT THE STICK TO RIGHT OR LEFT TO ROTATE HORIZONTALLY.

TILT THE STICK UPWARD OR DOWNWARD TO ROTATE VERTICALLY.

TILT THE C STICK TO RIGHT OR LEFT TO MOVE THE VIEWPOINT TO RIGHT AND LEFT.

TILT THE C STICK TO UPWARD OR DOWNWARD TO MOVE THE VIEWPOINT TO UPWARD OR DOWNWARD.

A BUTTON: FOR DETERMINATION
B BUTTON: FOR CANCELLATION

EMBLEM IMAGE

PROJECTED ONTO ALL
OF THE PLANES A-H

EMBLEM IMAGE

PROJECTED ONLY ONTO THE PLANE WHICH IS THE FIRST PLANE (IN THIS CASE, THE PLANE A) TO BE PROJECTED ONTO SEEN FROM THE POSITION OF THE PROJECTION LIGHT SOURCE.

EMBLEM IMAGE

PROJECTED ONTO ALL OF THE PLANES A-H

EMBLEM IMAGE

PROGRAM FOR PROJECTING AN IMAGE ONTO A CHARACTER IN A GAME, GAME MACHINE INCORPORATING THE PROGRAM, AND STORAGE MEDIUM HAVING THE PROGRAM STORED THEREON

BACKGROUND OF THE INVENTION

1. Field of the Present Invention

The present invention relates to a program for projection for pasting freely a desired image onto a character in a game, a game machine incorporating the program for projecting an image onto a character in a game, and a storage medium having thereon stored a program for projecting an image onto a character in a game.

2. Related Art

Conventionally, users sometimes have pasted desired images to characters appearing in games or changed the color and representation of the characters themselves.

For example, there is a technique for pasting a representation called "emblem (for example, an image of a flag or an animal)" on a predetermined position in a character such as a robot used by a user in a game. Furthermore, there is also a technique for adding a color or a pattern to a character being a car used by a user in a game. These are for making the users familiar with the characters used by the users themselves.

In these techniques, for example, before starting a game, an emblem-selection screen or an emblem-creation screen or a creation screen for adding a color or a pattern is selected by a predetermined selection procedure to the main menu, and the creation and selection are executed in the screen. Then, by storing the character after the creation in a memory etc. in the game machine and by calling it upon the start of a game, the character having the emblem etc. that the user him/herself has created or selected is displayed and the game starts actually.

On the other-hand, superimposing two (2)-dimensional image data by lettering a three (3)-dimensional model using so-called "three (3)-dimensional computer graphics" has also been practiced (for example, Japanese Patent Application Laid-Open Pub. No. 2001-351121).

However, conventionally, the position for pasting an emblem on a character is fixed and a user can not paste freely the emblem created by him/herself on various positions in a character.

In order to paste freely an emblem to not only a fixed position but also various positions in a character, it can be contemplated to, for example, move the fixed position as it is with an emblem. However, there is a problem that, on the position after moving, the shape of the character becomes different and more calculation has to be executed in order to make the emblem appear to be pasted on the character and, therefore, the amount of calculation is increased. This is because there are cases where the polygon planes are different between the fixed position and the position after its moving to the character.

Furthermore, in the case where a color or a pattern is added to a character being a car, the creation is executed in a creation screen where the car character is developed two (2)-dimensionally. Therefore, when the creation is executed in the creation screen and the created color or the pattern is pasted on the car character actually, the representation after pasting may be somewhat different from the representation desired by the user. Since it is necessary to create a representation etc. in a creation screen anticipating how the representation will look after its being pasted actually on a car character, there is a problem that a complicated operation such as repeating the creation step-many times is necessary and experienced skills are required.

SUMMARY OF THE INVENTION

The present invention was thus conceived in view of the above problems. It is therefore the object of the present invention to provide a program for enabling an emblem created by a user to be pasted freely to a character without any complicated operation even when the character has a complicated shape, a game machine storing the program and a storage medium storing the program.

In order to achieve the above object, the present invention provides a program for projecting a predetermined image onto a character of a game in a game machine including operation means for executing predetermined operation in a screen, calculation processing means for executing predetermined calculation, and control means connected with the operation means and the calculation processing means and for controlling the calculation processing means, the program being operable to effect an image creation step for creating an image consisting of two-dimensional coordinates with the control means by operating the operation means; and a step for arranging, based on an input signal from the operation means, the image created in the image creation step and a virtual light source for projecting the image onto a character, at arbitrary positions in the vicinity of the character in a three-dimensional virtual space, and for pasting on the character a projected image created by projecting the image onto the character from the projection light source.

The character of the present invention is constituted by a combination of a plurality of parts, and the program is operable to allow the control means to designate at least one of the parts as a projection target of the image in response to the operation of the operation means and to paste the projected image to the designated part.

In order to achieve the above object, the present invention provides a game machine comprising operation means for executing predetermined operation in a screen, calculation processing means for executing predetermined calculation, and control means connected with the operation means and the calculation processing means and for controlling the calculation processing means, the game machine incorporating a program for projecting a predetermined image onto a character of a game, the program being operable to effect an image creation step for creating an image consisting of two-dimensional coordinates with the control means by operating the operation means; and a step for arranging, based on an input signal from the operation means, the image created in the image creation step and a virtual light source for projecting the image onto a character, at arbitrary positions in the vicinity of the character in a three-dimensional virtual space, and for pasting on the character a projected image created by projecting the image onto the character from the projection light source.

The character of the present invention is constituted by a combination of a plurality of parts, and the program is operable to allow the control means to designate at least one of the parts as a projection target of the image in response to the operation of the operation means and to paste the projected image to the designated part.

In order to achieve the above object, the present invention provides a storage medium having thereon stored a program for projecting a predetermined image onto a character of a game in a game machine including operation means for executing predetermined operation in a screen, calculation processing means for executing predetermined calculation, and control means connected with the operation means and the calculation processing means and for controlling the calculation processing means, the program being operable to effect an image creation step for creating an image consisting of two-dimensional coordinates with the control means by operating the operation means; and a step for arranging, based on an input signal from the operation means, the image created in the image creation step and a virtual light source for projecting the image onto a character, at arbitrary positions in the vicinity of the character in a three-dimensional virtual space, and for pasting on the character a projected image created by projecting the image onto the character from the projection light source.

In the storage medium of the present invention, the step of pasting such a projection image onto a character includes controlling the control means such that calculation is made by the calculation processing means using alpha value of each polygon making up the character being a predetermined value.

The character of the present invention is constituted by a combination of a plurality of parts, and the program is operable to allow the control means to designate at least one of the parts as a projection target of the image in response to the operation of the operation means and to paste the projected image to the designated part.

In order to achieve the above object, the present invention provides an image display control program for operating a computer as image data creation means for creating image data for displaying on a display device an object image created by projecting a predetermined projection image onto an object consisting of three-dimensional coordinates in a three-dimensional virtual space, the image display control program being operable to allow the control means to effect functions of creating predetermined projection image data to be projected onto the object; arranging the object and the projection image in the virtual space; determining, based on operation of an operator, the relative position of the projection image to the object and the position of a virtual light source which projects the projection image onto the object; calculating the distance between the virtual light source and a projection plane containing the projection position on the object, and calculating the projection plane of the object, onto which the projection image is projected, removing from the projection targets the projection planes at a predetermined distance or farther from the virtual light source; projecting the projection image onto the projection plane with the virtual light source as a viewpoint, and pasting the projection image to the projection plane of the object; and creating object image data for the object to which the projection image is pasted.

The image display control program of the present invention is operable to allow the control means to effect a function of creating image data of the projection image based on a operation signal inputted from operating means by a user.

The image display control program of the present invention is operable to allow the control means to effect functions of projecting the projection image onto a transparent object having a same or an approximately same shape as that of the object and pasting the projection image to the transparent object; and causing the display device to display the transparent object to which the projection image is pasted, in such a manner as to be superimposed on the object.

The image display control program of the present invention is operable to effect a function of changing the transparency degree of the projection object when it is determined from the relation between the positions of the virtual light source, the projection object and the object that deformation of projection image pasted to the object is remarkable.

The object of the present invention consists of a combination of a plurality of parts, and the image display control program is operable to allow the control means to effect a function of designating at least one of the parts as a projection target of the projection image in response to operation of an operator, and pasting the projection image to the designated part(s).

In order to achieve the above object, the present invention provides an image display control program for operating a computer as image data creation means for creating image data for displaying on a display device an object image created by projecting a predetermined projection image onto an object consisting of three-dimensional coordinates in a three-dimensional virtual space, the image display control program being operable to allow the control means to effect functions of creating predetermined projection image data to be projected onto the object; arranging the object and the projection image in the virtual space; determining, based on operation of an operator, the relative position of the projection image to the object and the position of a virtual light source which projects the projection image onto the object; calculating for each pixel respectively the distance between the virtual light source and a projection plane containing the projection position on the object, projecting with the virtual light source as a viewpoint the pixels of the projection image onto the pixels on the projection plane closest to the viewpoint, and pasting the projection image onto the projection plane of the object; and creating object image data for the object to which the projection image is pasted. Thereby, for example, when an emblem image created is pasted on each of the front face and the back face constituting an object, the emblem image is pasted only on a projection plane being closest to the viewpoint.

According to the present invention, it is possible to provide a program for enabling a representation created by a user to be freely pasted on a character even when the character has a complicated shape.

BRIEF DESCRIPTION OF THE DRAWINGS

FIG. 15A is a perspective view showing the relation between the texture plane 31 and an emblem while

FIG. 16A is a perspective view showing the relation between the texture plane 31 and the emblem while

FIG. 18A is a perspective view showing the relation between the texture plane 31 and the emblem while

FIG. 19A is a perspective view showing the relation between the texture plane 31 and an emblem while

FIG. 20A is a perspective view showing the relation between the texture plane 31 and the emblem while FIG. 21A is a perspective view showing the relation between the texture plane 31 and the emblem while

DETAILED DESCRIPTION OF THE PREFERRED EMBODIMENTS

Embodiments of the present invention will now be described in detail with reference to the drawings.

Figure 1:
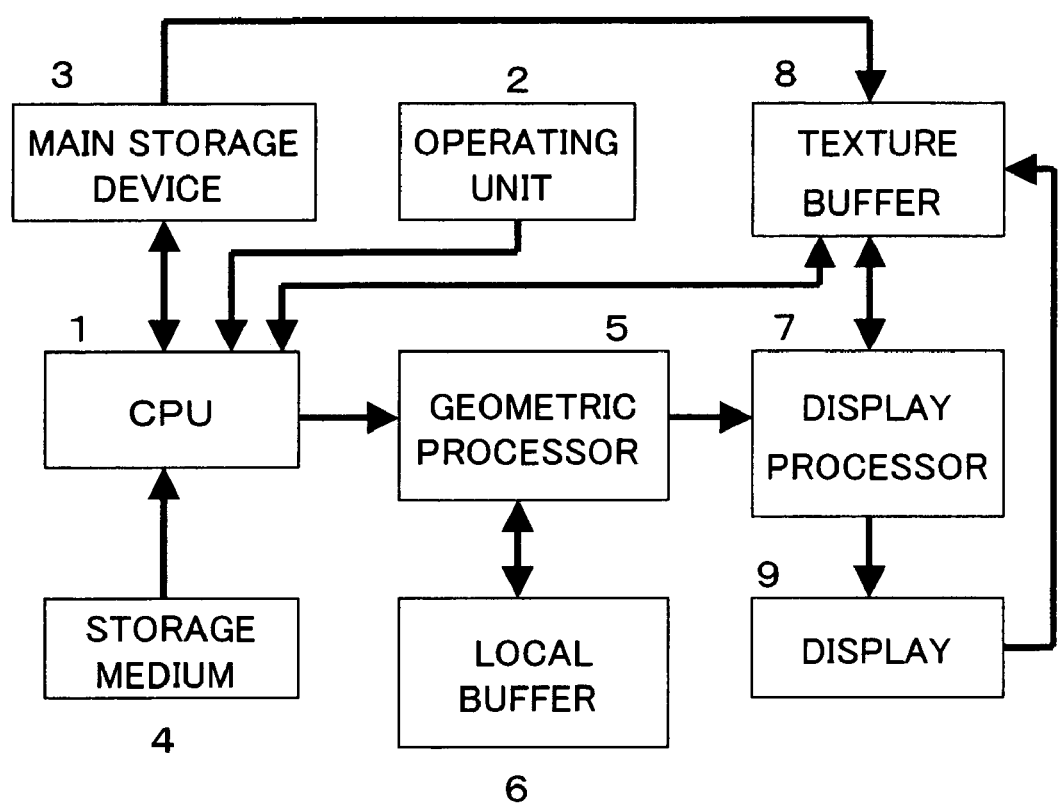
FIG. 1 shows the internal configuration of a game machine to which the present invention is applied.

FIG. 1 shows the internal configuration of a game machine 50 to which the present invention is applied.

The game machine 50 comprises a CPU 1, an operating unit 2, a main storage device 3, a storage medium 4, a geometric processor 5, a local buffer 6, a display processor 7, a texture buffer 8 and a display 9.

The CPU 1 is connected with the operating unit 1, the main storage device 3, the storage medium 4 and the texture buffer 8. The CPU 1 is for being inputted with a control signal relating to various operations at the operating unit 2 by a user as well as executing various programs stored in the main storage device 3 and the storage medium 4. The details of this will be described later.

The operating unit 2 is connected with the CPU 1 and plays a role of an interface with a game machine 50 and a user, and is capable of creating an emblem described later, pasting a character and, furthermore, operating an character while executing a game, by various operations by the user. Then, the operating unit 2 outputs to the CPU 1 the control signal corresponding to a predetermined operation of the user.

The main storage device 3 is connected with the CPU 1 as well as connected with the texture buffer 8. The main storage device 3 stores various programs including a program for displaying an emblem. Furthermore, the main storage device 3 also stores various data for the programs executed by the CPU 1.

The storage medium 4 records programs different respectively for each kind of game and consists of, for example, media such as CD-ROMs. The storage medium 4 is detachable from the game machine 50 and, when the storage medium 4 is attached to the game machine 50, a program stored in the storage medium 4 is caused by the control, of the CPU 1 to be outputted to the main storage device 3 through the CPU 1.

The geometric processor 5 is connected with the CPU 1, the local buffer 6 and the display processor 7. The geometric processor 5 is inputted with various data outputted from the CPU 1 and executes calculation to display images etc. based on such data. As a result of the calculation, the calculated data are outputted to the display processor 7.

The local buffer 6 is connected with the geometric processor 5 and stores the processed data outputted from the geometric processor 5 when necessary.

The display processor 7 is connected with the texture buffer 8 as well as with the display 9. The display processor 7 executes processing to cause the display 9 to actually display, based on the calculated data calculated at the geometric processor 5 and outputs the calculated data as image data to the display 9. In addition, the display processor 7 outputs to the texture buffer 8 as appropriate based on the processed data from the geometric processor 5.

The texture buffer 8 stores temporarily the texture outputted from the display processor 7 as well as is connected with the display 9 and stores temporarily Z-values indicating the depth for the displayed image (frame image). This storing of the Z-values will be described later. The texture buffer 8 is also connected with the CPU 1 and the main storage device 3, and stores temporarily data transferred from the main storage device 3 by being inputted with control signals from the CPU 1.

The display 9 is for displaying actually game images based on the image data outputted from the display processor 7. In addition, the display 9 also outputs the above-described Z-values to the texture buffer 8.

Figure 2:
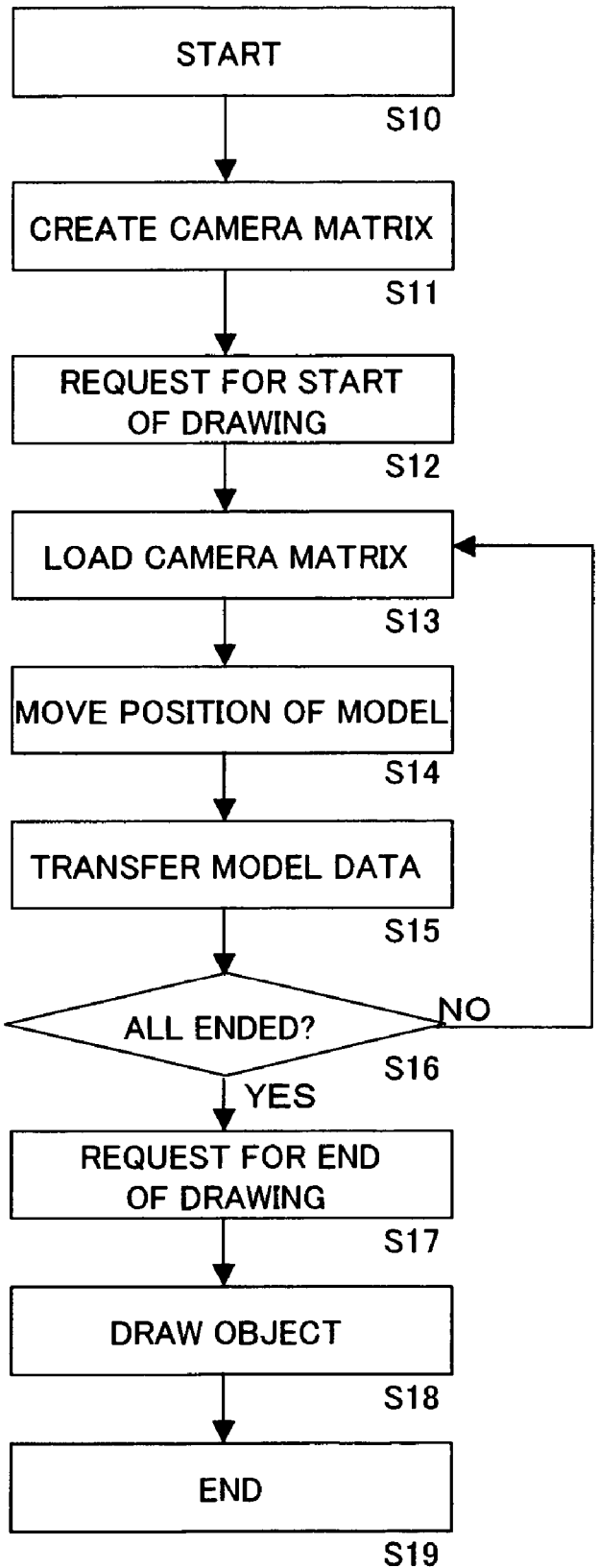
FIG. 2 is a flowchart showing the process for drawing an object.

Next, referring to FIG. 2, the process of drawing for causing characters (objects) being the target to paste emblems on, to be displayed will be described. The program for this process of drawing is stored in the storage medium 4. It is the premise that, when the storage medium 4 has been attached to the game machine 50, the program is read out with the control of CPU 1, is transferred to the main storage device 3 and is stored in the main storage device 3. Naturally, the case is also applicable, where the program is incorporated in the game machine 50 in advance and is stored in the main storage device 3 in advance.

First, when processing for drawing an object is started (Step S10), the CPU 1 creates a camera matrix (Step S11). Here, it is assumed that, when an object (character) is present at a predetermined position in a global coordinate system (x, y, z), the position of a viewpoint based on which the object is displayed actually on the display 9 is present at an arbitrary position in the coordinate system. Assuming that a "camera" is positioned at the position of the viewpoint, the position of the camera is represented in a determinant. Then, this determinant is a camera determinant. As what is included in the camera determinant, in addition to the coordinates of the position of the camera in the global coordinate system, the value of the angle from the origin of the global coordinate system is also included. The matrix for the camera is represented by, for example, a 4×3 determinant or a 4×4 determinant. However, it is surely possible to represent it with another "n×m" determinant. The created determinant is outputted to the main storage device 3 and is stored at the main storage device 3.

Then, the CPU 1 outputs a request for the start of drawing to the geometric processor 5 (Step S12). Thereby, the geometric processor 5 starts processing for drawing the object. In this embodiment, this request is outputted for each time period for each one (1) frame of the game image displayed on the display 9 (1/60 second: for the case where 60 frames are displayed in one (1) second) because drawing of an image including the object is executed for each one (1) frame respectively.

Next, the CPU 1 reads the determinant for the camera created in Step S11 from the main storage device 3 (Step S13).

Next, the CPU 1 executes a process for moving the position of a model (Step S14). That is, the CPU 1 executes a process for calculating the position of the object relative to the position of the camera based on the determinant for the camera read out in Step S13 and the position of the object (model). Specifically, a process for calculating the position of the object for the case where the position of the camera is taken as the origin is executed based on the position of the object and the position of the camera both being represented in the global coordinate system. Thereby, the position of the object relative to the position of the viewpoint of the camera, i.e., the position of the object actually displayed on the screen of the display 9 can be obtained.

Next, the CPU 1 transfers the data of the model (Step S15). Specifically, the CPU 1 outputs the data of the model indicating the relative position of the object calculated in Step S14 to the main storage device 3. The main storage device 3 stores temporarily the data for the model.

Next, the CPU 1 determines whether the relative positions have been calculated for all the objects contained in one (1) frame (Step S16). If there are objects in the frame, for which the relative positions have not been calculated (in the case of "No" in Step S16), the process returns to Step S13 again, and the determinant for the camera is called from the main storage device 3 and the position relative to the camera described above are calculated for each object.

When calculation for all the objects contained in one (1) frame has been executed (in the case of "Yes" in Step S16), the CPU 1 outputs a request for the end of the drawing to the geometric processor 5 (Step S17). Then, the CPU 1 reads out the model data of each object stored in the main storage device with the output of the request as a trigger and outputs it to the geometric processor 5. Thereby, the geometric processor 5 executes calculation for displaying actually the object on the display screen 9 based on the model data.

That is, based on the calculated data outputted from the geometric processor 5, the display processor 7 executes a process for displaying an image and its output is outputted to the display 9. Then, the object being the target to paste the emblem on is displayed on the screen of the display 9 (Step S18). Then, the process for object drawing is ended (Step S19).

In the object drawing process (Step S18), the object consisting of transparent polygon planes having no color expression is represented after the α-value of polygons representing each respective object have been all set to "zero (0)" (or "one (1)") at the geometric processor 5. This is for reducing the amount of calculation.

Figure 3:
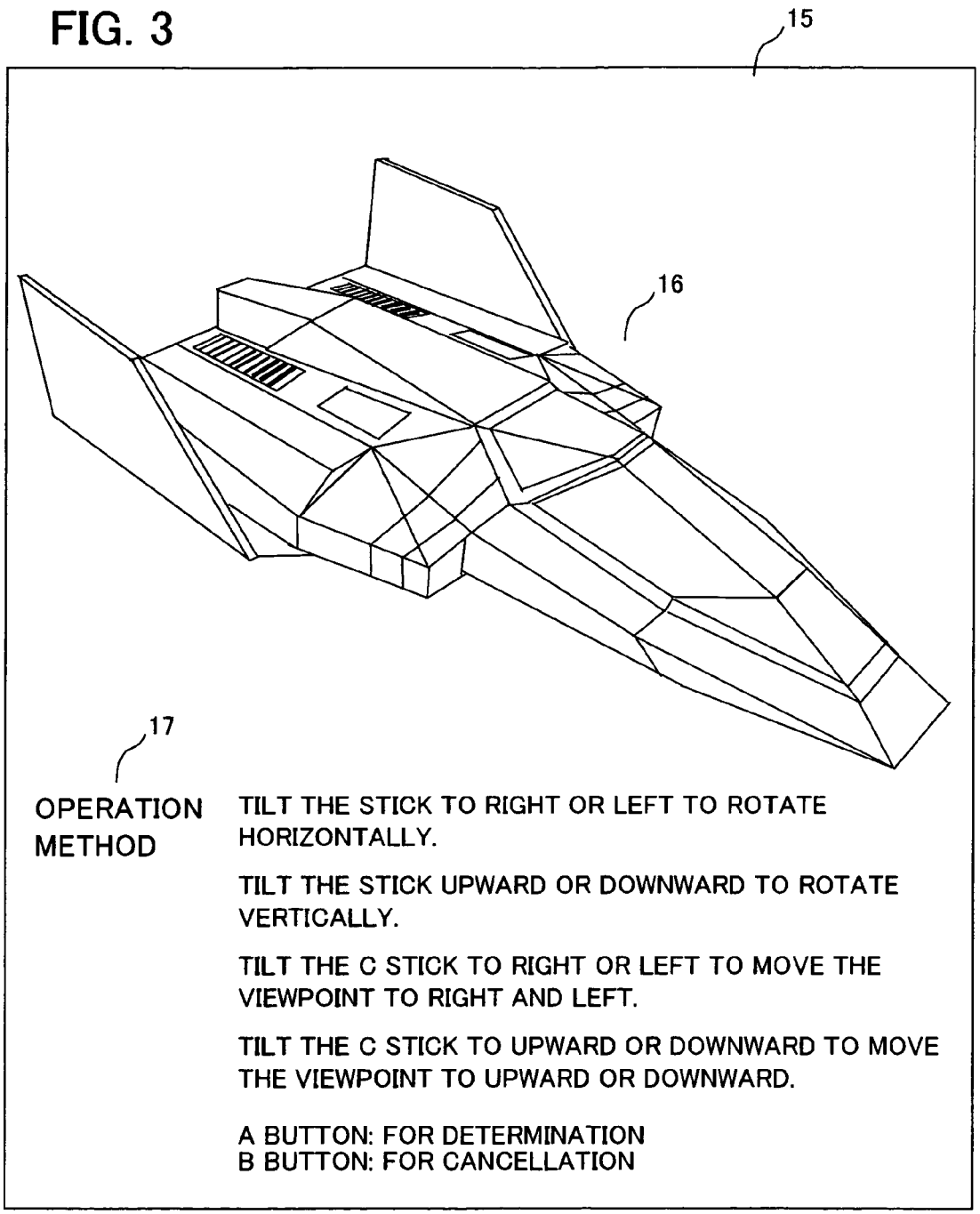
FIG. 3 shows an example of the case where an object to which an emblem is pasted is displayed on a screen.

An example of an object actually displayed on the display 9 by this drawing process is shown in FIG. 3. A character 16 used in a game by a user is displayed at almost the center of a display screen 15. This character 16 is the character to paste the emblem on. It is hard to see in the figure but a transparent character is actually represented.

An operation method 17 is displayed in the lower portion of the screen 15. The operation method 17 indicates the correspondence between the operation on the screen of the display 9 and the operating unit 2 and the position of the character 16 can be changed by the operation at the operating unit 2 according to the operation method 17. For reference, this screen is adapted to be displayed by, for example, selecting the selection screen such as personal data etc. in the main menu.

Figure 4:
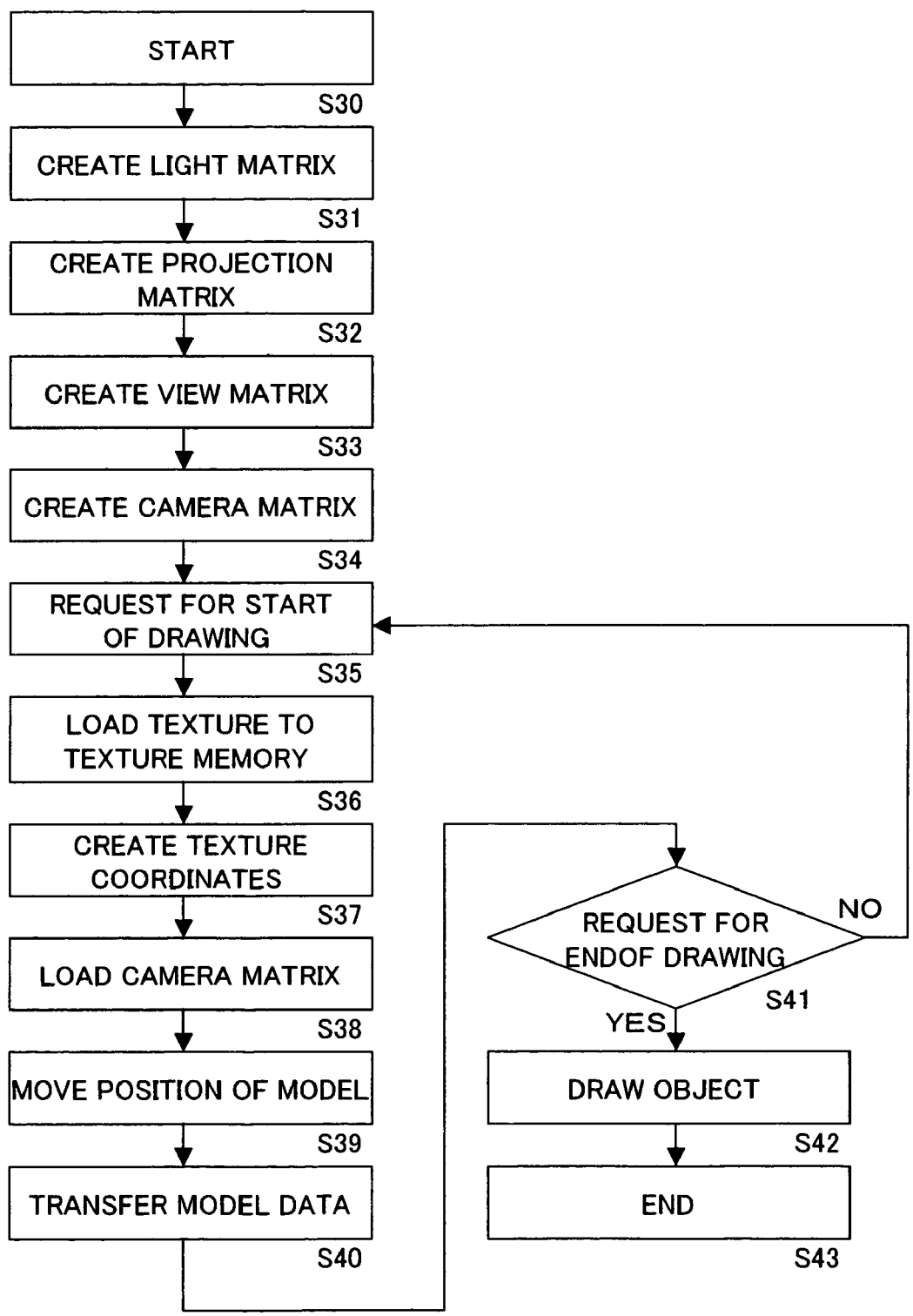
FIG. 4 is a flowchart showing the process for projection.

Next, a process for pasting a desired emblem by projecting it on the character displayed as shown in FIG. 3 will be described referring to FIG. 4. However, it is a premise that the emblem has been created in a stage before the process is started.

Figure 5:
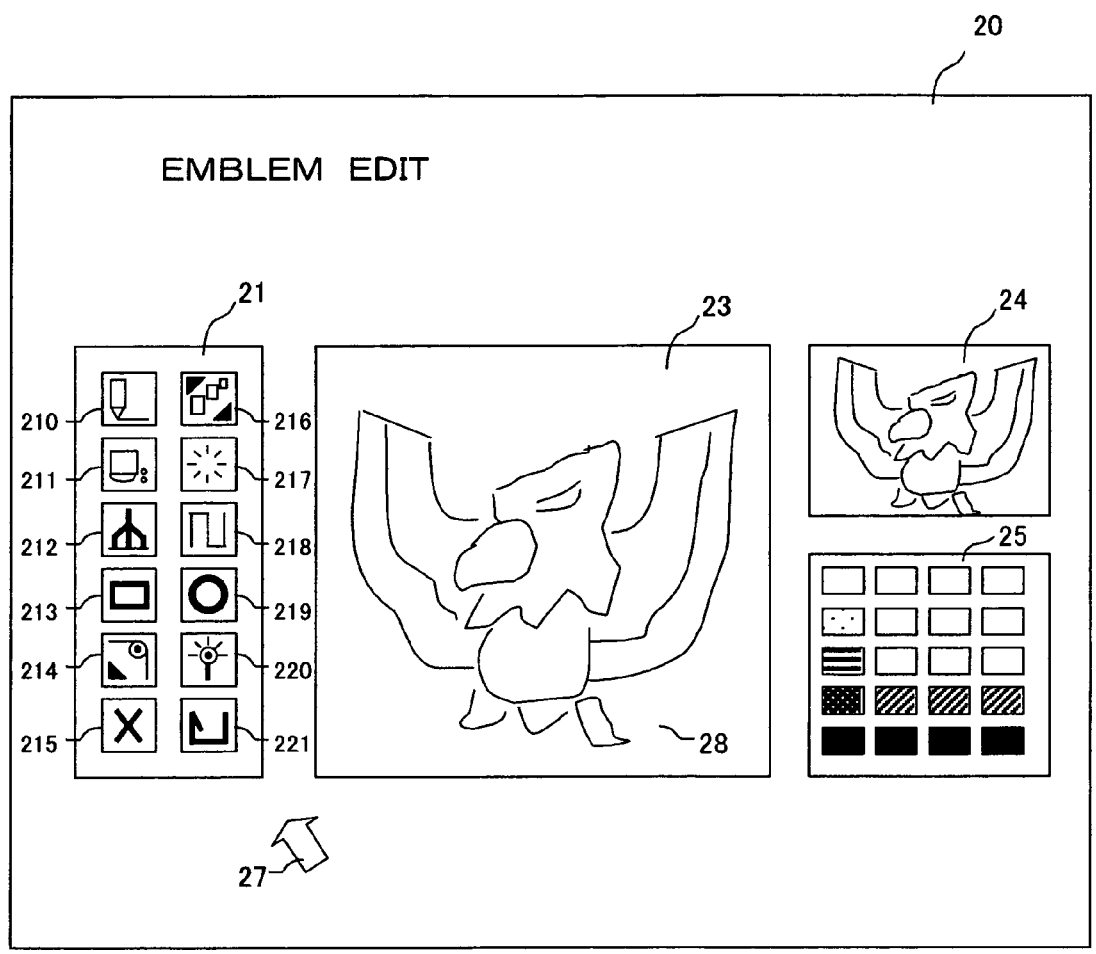
FIG. 5 shows an example of an emblem creation screen.

An example of a creation screen of the emblem is shown in FIG. 5. Here, the emblem is an image to paste on a desired position in the character displayed in FIG. 3. The user can process the emblem into a preferred image or edit the emblem on this creation screen. This creation screen is also adapted to be displayed by executing predetermined selection of, for example, personal data in the main menu of the game.

This creation screen (EMBLEM EDIT) mainly comprises an emblem creation button group 21, an emblem enlarging screen 23, a display screen 24 and a color selection button group 25.

The emblem creation button group 21 comprises a plurality of buttons 210-221 to create an emblem 28 in the screen, and is adapted to select an icon 27 on a screen by predetermined operation at the operating unit 2

The button 210 is a button to draw lines freely on the enlarging screen 23. The buttons 21 are adapted to be able to draw lines freely within the enlarging screen 23 when any of the buttons 21 is clicked by operating the icon 27 within the screen.

The button 211 is a button as a so-called "eraser" and can erase lines having been drawn by operating the icon 27 within the enlarging screen 23.

The button 212 is a button for painting and is adapted to put a color within a predetermined area where the icon 27 is positioned by moving the icon to a predetermined position within the enlarging screen 23 by clicking the button 212, and by executing predetermined operation.

The button 213 is a button for drawing squares and squares can be drawn within the enlarging screen 23 by operation on the screen.

The button 214 is a button for previewing the drawn emblem 28 and the button 215 is a button for ending the creation screen.

The button 216 is a button for setting the thickness of a pen and the thickness of lines constituting the emblem drawn on the enlarging screen 23 can be set with this button.

The button 217 is a button for clearing the emblem 28 drawn on the enlarging screen 23 and the button 218 is a button for drawing straight lines.

The button 219 is a button for drawing circles and the button 220 is a button for further enlarging the emblem 28. Then, the button 221 is a button for a so-called "Undo" function, and is a button for canceling the operation immediately before clicking of the button and recovering the state of operation.

The enlarging screen 23 is adapted to be able to enlarge and display the emblem 28 and execute fine adjustment.

Figure 10:
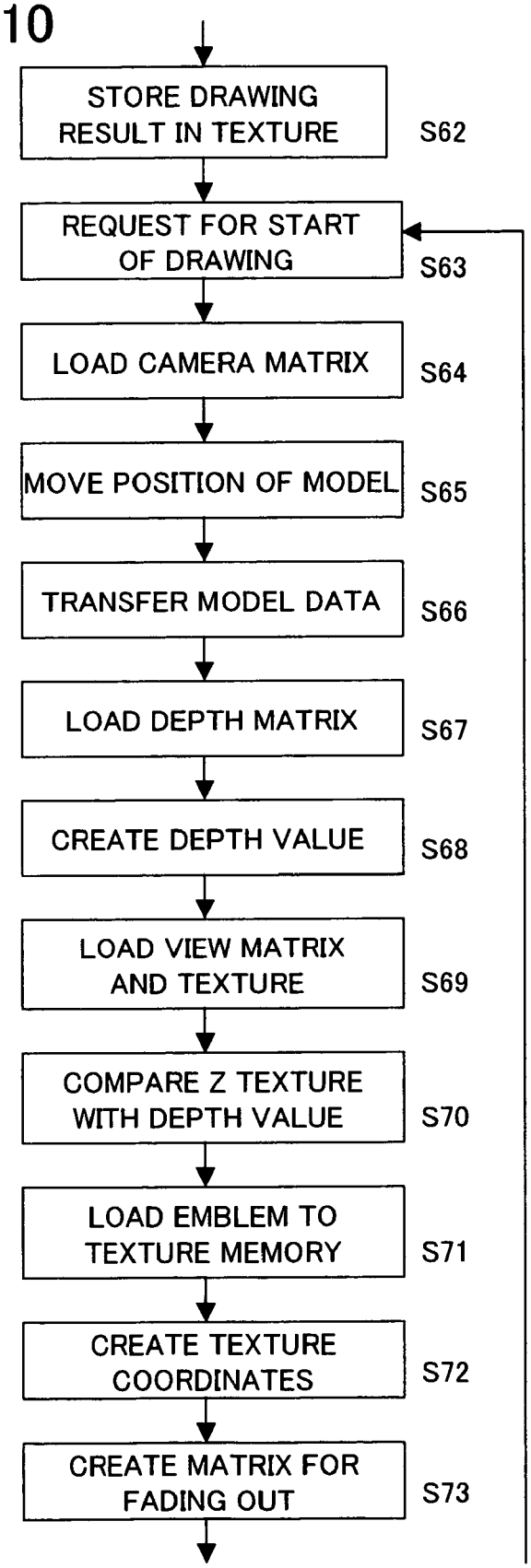
FIG. 10 is a flowchart showing the process of the entire representation in a game.

The display screen 24 is a screen on which the emblem 28 is displayed approximately in the same size as an emblem displayed on a screen on which projection is executed as shown in FIG. 10. The user can create the emblem 28 on the enlarging screen 23 checking this screen.

The color selection button group 25 has a plurality of colors represented respectively by each of the buttons and are adapted to put a color on the emblem 28 displayed on the enlarging screen 23 by moving the icon 27 on the screen 20 and selecting a button representing a desired color.

The emblem creation screen 20 is displayed as follows. That is, a program for displaying the emblem creation screen having been recorded is stored in the storage medium 4 and the CPU 1 reads out this program and outputs predetermined data for displaying to the geometric processor 5. The geometric processor 5 executes a process for displaying and outputs calculated data to the display processor 7. The display processor 7 generates the data for displaying based on the calculated data and outputs it to the display 9 and the actual emblem creation screen is displayed on the display 9.

Then, by predetermined operation at the operating unit 2, its control signal is outputted to the CPU 1 and the CPU 1 repeats displaying corresponding to the operation by the procedure described above. By operating the end button 215, the emblem 28 having been created on the creation screen 20, i.e., the data for executing the calculation at the geometric processor 5 for displaying the emblem 28 is stored in the main storage device 3. That is the process for creating an emblem.

Referring again to FIG. 4, the projection process in which the emblem 28 having been created as above is pasted on the character 16 will be described. The program for such a projection process is stored in the storage medium 4. When the storage medium 4 is attached to the game machine 50, the program is read out by the control of the CPU 1, transferred to the main storage device 3 and stored in this main storage device 3. Surely, the case is also applicable, where the program is not stored in the storage medium 4 but in the main storage device 3 in advance, and the game machine 50 is an program-installed-type game machine in which the program is installed.

When the projection process is started (Step S30), the CPU 1 creates a light matrix. The creation of a light matrix means creating a determinant indicating an arbitrary position (light position) for the character 16 represented in the global coordinate system. The viewpoint from this light position is the viewpoint of a screen for pasting the emblem 28 to the character 16. For reference, in this case, the position of the light and the position of the camera described above are same as each other. As the case where the positions are different from each other, the case can be considered where, for example, the character 16 itself is from a viewpoint at the camera and the emblem 28 is from a viewpoint at the light while a game is actually being executed. By adapting as above, it is possible to display, for example, the emblem 28, having a different viewpoint from the viewpoint from the actual screen, on the side of the character 16.

Figure 6:
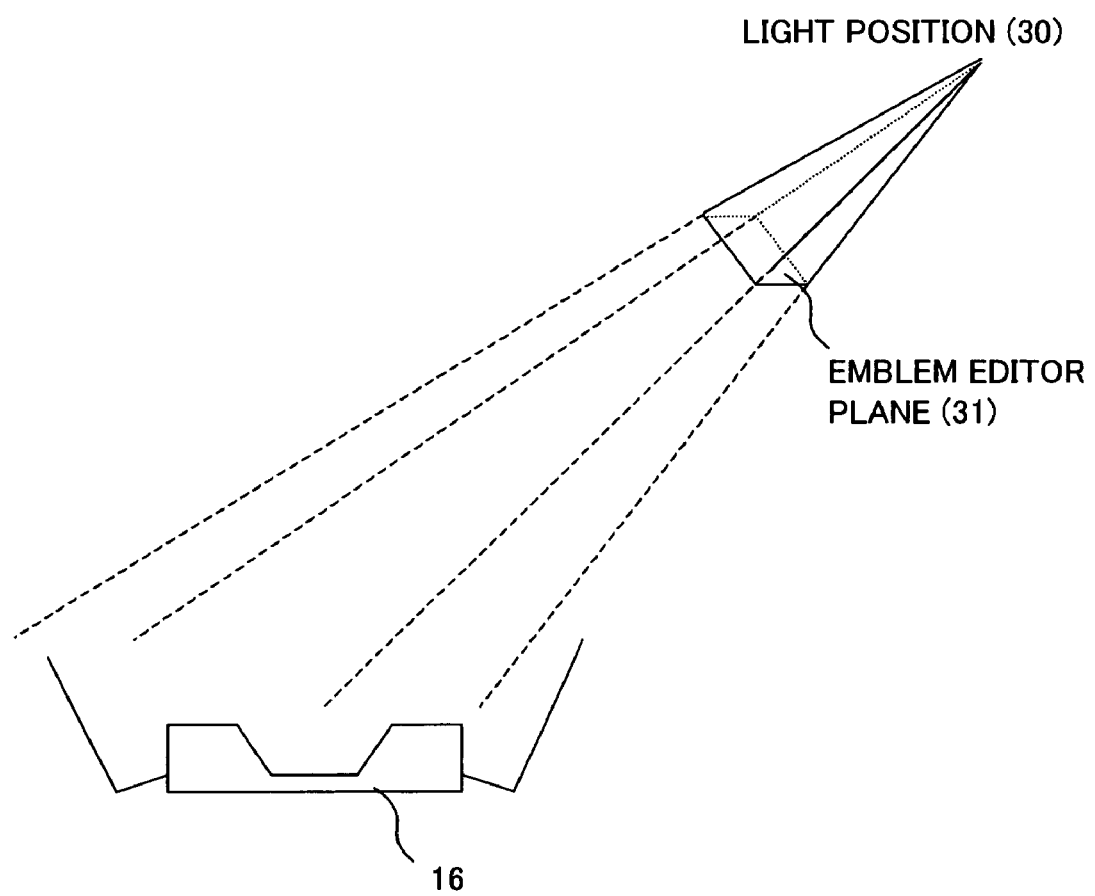
FIG. 6 illustrates the concept of projection.

In FIG. 6, there is shown the case where the character 16 and a light position 30 are present at predetermined positions in the global coordinate system. In this case, the light position 30 is positioned on the right behind the character 16. When the light position 30 and the camera position are same, the viewpoint from the light position 30 is displayed on the actual screen.

Furthermore, as shown in FIG. 6, the emblem texture plane 31 is present at a position at a predetermined distance from the light position 30. This is the texture plane on which the emblem 28 created on the emblem creation screen 20 (see FIG. 5) described above is displayed.

Since the light position and the camera position are same as each other in this case, the light matrix is expressed in the same determinant as that of the camera described above. The light matrix created is outputted to the main storage device 3 and stored in it temporarily.

Referring again to FIG. 4, then, the CPU 1 having created the light matrix creates a projection matrix (Step S32). This projection matrix is a determinant for indicating the position where the emblem texture plane 31 shown in FIG. 6 is displayed and the size of the texture plane 31. Here, since the position of the emblem texture plane 31 is positioned at a predetermined distance from the light position 30 in the global coordinate system, this projection matrix can be created from this distance and the size of the texture plane 31. The emblem texture plane 31 is represented as, for example, 0.5× 0.5 in the initial settings. 0.5 indicates a half of the screen displayed on the display 9 and 0.5×0.5 indicates a half of the vertical size and the horizontal size respectively of a screen. The created projection matrix is outputted to the main storage device 3 and is stored in it temporarily.

Next, the CPU 1 creates a view matrix (Step S33). The creation of this view matrix is executed by multiplying the light matrix created in Step S31 by the projection matrix created in Step S32. That is, the view matrix is created by reading out with the CPU 1 the light matrix and the projection matrix stored in the main storage device 3, and by multiplying the former by the latter.

Next, the CPU 1 creates a camera matrix (Step S34). As described above, the camera matrix is a determinant indicating the viewpoint on the screen of the display 9 and, here, the light position 30 and the camera position are same. Therefore, a determinant having the same contents as that of the light matrix is created. The detailed process of the creation is same as the creation of the camera matrix in the drawing process of the object of FIG. 2 described above (Step S11).

Next, the CPU 1 outputs a request for the start of drawing to the geometric processor 5 (Step S35). The timing of outputting of this request is also at every 1/60 second (the time period in which one (1) frame is displayed) in the game machine 50 in the embodiment that can display 60frames in one (1) second, similarly to the drawing process. (FIG. 2) of the object described above.

Next, the CPU 1 outputs the emblem texture to the texture buffer 8 (Step S36). Since the emblem 28 shown in FIG. 5 is stored in the main storage device 3, the CPU 1 reads out data for displaying the emblem 28 from the main storage device 3 and outputs the data to the texture buffer 8 and the data is stored in the texture buffer 8.

Next, the CPU 1 creates texture coordinates (Step S37). That is, the coordinates of the emblem positioned on the texture plane 31 are converted into those of the position where the character 16 is present such that the emblem 28 created is pasted on each polygon plane of the character 16. The creation of this texture coordinates is executed using the view matrix created in Step S33 and the three (3)-dimensional coordinates of the character 16. On the texture plane, the emblem 28 is represented by two (2)-dimensional coordinates (a so-called u-v coordinate system). However, since the coordinates of each apex forming the polygons of the character 16 are three (3)-dimensional coordinates, the texture coordinates to be created are represented as three (3)-dimensional coordinates. Since such texture coordinates are coordinates converted into coordinates of the character 16, an image in which the emblem created by the user is pasted on the character 16 can be displayed.

Next, the CPU 1 loads the camera matrix (Step S38). That is, the CPU 1 executes a process for reading the camera matrix created in Step S34 from the main storage device 3.

Next, the CPU 1 executes a moving process of the position of the model, i.e., a conversion process of the relative position of the object (in this case, the character 16 with the emblem 28 pasted on it) from the camera viewpoint (Step S39). Similarly to the drawing process of the object, the camera viewpoint becomes the viewpoint from an actual screen on the display 9 and, the coordinates of the position of the object are calculated with this camera position as, for example, the origin against the camera position at an arbitrary position in the global coordinate system.

Next, the CPU 1 outputs each data calculated in Step S39 to the main storage device 3 (Step S40) and the main storage device 3 stores these data (model data).

Next, when calculating the relative positions for all objects in one (1) frame, a request for ending the drawing is outputted to the geometric processor 5 (in the case of "Yes" in Step S41). When the CPU 1 does not output the request for ending the drawing to the geometric processor 5 (in the case of "No" in Step S41), that is, when calculation for all the objects contained in one (1) frame has not been completed, the process goes to Step 35 again and the above steps are repeated.

Then, the CPU 1 reads out the model data stored in the main storage device 3 in Step 40, based on the output of this request, and outputs the data to the geometric processor 5. Thereby, the geometric processor 5 executes a process for displaying actually the object with the emblem pasted on it on the display screen 9. Furthermore, the display processor 7 executes a process for displaying images from the calculated data outputted from the geometric processor 5 and the resulting output is outputted to the display 9. Then, on the display 9, the object with the emblem pasted on it is displayed (Step S42). Then, the process for drawing the object is ended (Step S43).

Figure 7:
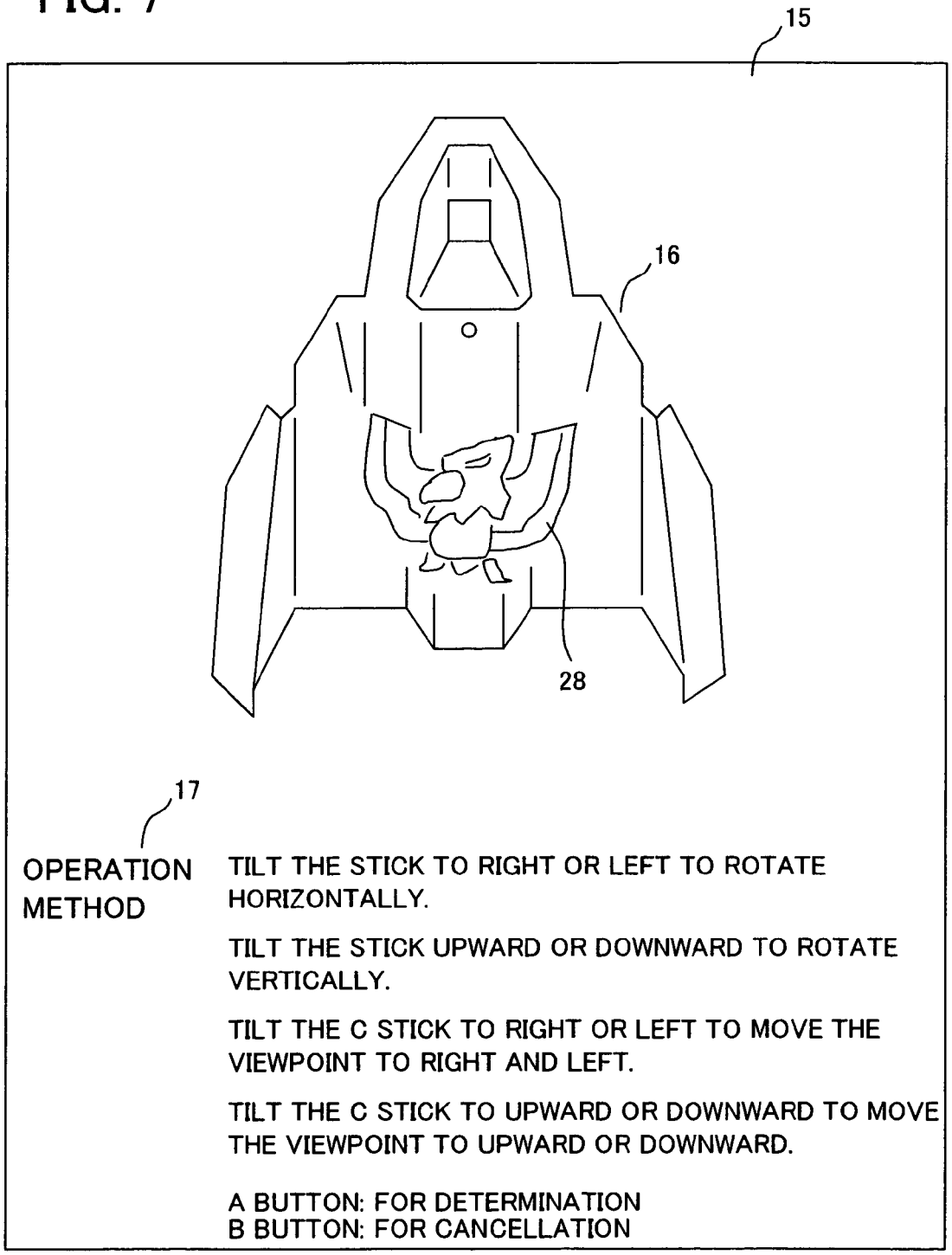
FIG. 7 shows an example of a screen immediately before actually projecting.
Figure 8:
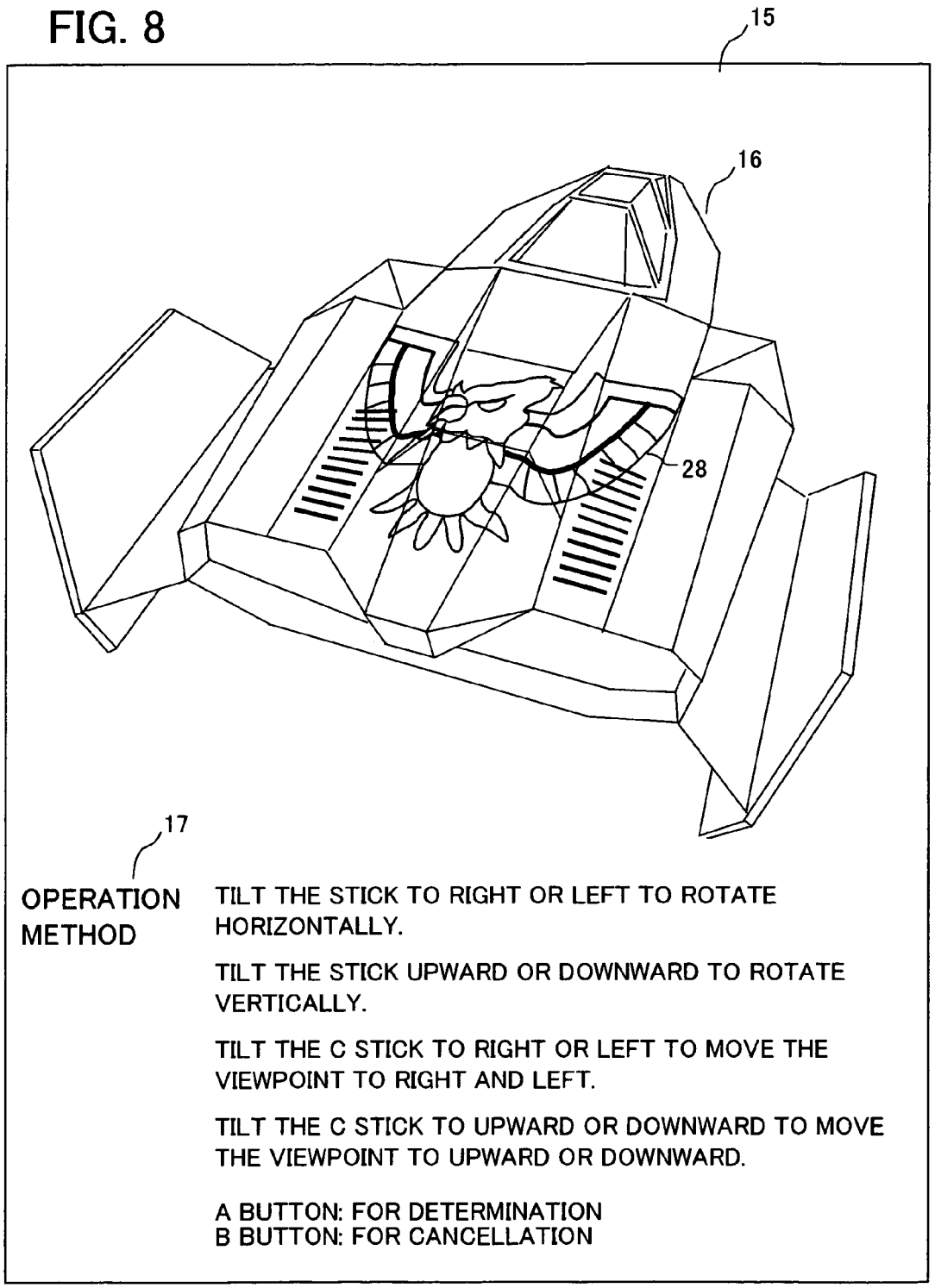
FIG. 8 shows an example of a screen immediately after actually projecting.

The object is actually displayed on the display 9 by this projection process. An example of the object is shown in FIG. 7 and FIG. 8. FIG. 7 shows a screen immediately before pasting the emblem to the character 16 and the creation of texture coordinates has not been executed in terms of processing (the case where the process of Step S37 is not executed). FIG. 8 shows an image for the case where the emblem is pasted on the character 16 (the case where the creation of the texture coordinates is executed in Step S37).

In FIG. 7, since the emblem 28 has not been pasted on the character 16, the emblem 28 displayed on the actual display screen 24 on the emblem creation screen 20 shown in FIG. 5 is displayed as it is on the screen 15. The operation method 17 is displayed in the lower portion of the screen 15 and the user can move the position of the emblem 28 and change its size by operating the operating unit 2 following this description.

When the size of the emblem is changed using the operating unit 2, a control signal corresponding to the change is outputted from the operating unit 2 to the CPU 1 and the CPU 1, based on the control signal, creates a projection matrix corresponding to the size according to the creation of the projection matrix in Step S32 of the process for projection described above (FIG. 4.). That is, when the size has been changed, the value of 0.5 in the initial settings is changed and the above projection process is executed by creating a projection matrix using a value corresponding to the changed size.

Furthermore, when the position of the emblem is desired to move, the process is executed by predetermined operation using the operating unit 2. That is, a control signal corresponding to the changed position is outputted from the operating unit 2 to the CPU 1. Then, the CPU 1, based on this control signal, changes the viewpoint position on the screen, i.e., the position of the light and the angle from the origin in the global coordinate system, creates a light matrix corresponding to the moved position in Step S31 and executes the process after that (see FIG. 4). Thereby, the emblem 28 can be moved.

Furthermore, when the position to display the character 16 is desired to be changed, the change is executed by predetermined operation using the operating unit 2 for the screen displayed in the drawing process of the object described above (FIG. 2). That is, a control signal corresponding to the operation is outputted from the operating unit 2 to the CPU 1 and, based on this control signal, the CPU 1 creates a camera matrix corresponding to the changed display position in Step S11 and executes the process after that. Thereby, the change can be realized.

Then, the user confirms on the screen 15 the position and the size of the emblem 28 against the character 16 as shown in FIG. 7 and, when there is no problem, the user operates the operating unit 2 with predetermined operation. Thereby, the steps of the process of projection described above (FIG. 4) have been all executed and the character 16 is displayed on the screen in a state where the emblem 28 is pasted on the actual character 16 shown in FIG. 8.

The move of the viewpoint of the character 16 can also be realized by creating a determinant corresponding to the positions to where the camera matrix and the light matrix are moved (Step S30, Step S34).

Here, as to the pasting of the emblem, it is possible to execute it for each part of the character 16 consisting of one (1) or a plurality of polygons.

Furthermore, the character 16 displayed is displayed being transparent. However, the position on the character 16 to paste the emblem is determined such that it is on the nearest polygon plane, i.e., the polygon closest to the camera plane.

As described above, the projection of the emblem 28 onto the character 16 can be executed. Therefore, it is possible for the user to paste the emblem 28 freely on the character at a position where the user desires to paste it, watching the screen. In addition, since it is possible to check the character 16 immediately after the emblem 28 has been pasted on it, any one can paste a desired emblem without any experienced skill. Furthermore, since the projection is executed by the predetermined operation to the operating unit 2, complicated operation is not necessary.

Figure 9:
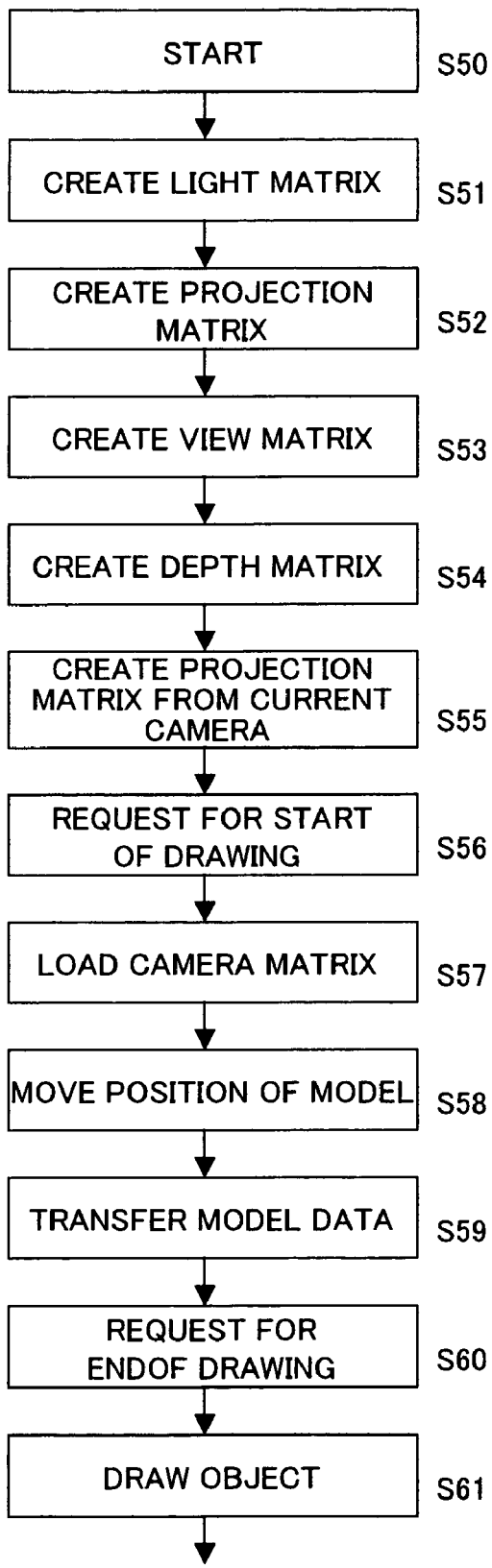
FIG. 9 is a flowchart showing the process of the entire representation in a game.

Next, a process for displaying a game including the character 16 with the emblem 28 pasted on it in the case where a game is actually played will be described referring to FIGS. 9-11. The program for such a process for displaying is stored in the storage medium 4. When this storage medium 4 is attached to the game machine 50, the program is transferred to the main storage device 3 by the control of the CPU 1 and stored in the main storage device 3 and the steps after this is executed. Surely, this is applicable to a program-installed-type game machine in which a program for this process has been stored in the main storage device 3 in advance.

First, when the process for displaying a game is started (Step S50), the CPU 1 creates the light matrix (Step S51). This is same as the creation of the light matrix (Step S31) of the projection process described above (FIG. 4). That is, what represents a predetermined position in the global coordinate system (the light position) with a determinant is created. This is also represented by m lines and n columns. The created light matrix is outputted to the main storage device 3 and stored in it temporarily.

Next, the CPU 1 executes a process for creating a projection matrix (Step S52). This is same as the creation of the projection matrix (Step S32) of the projection process (FIG. 4) described above. That is, since the distance from the viewpoint position 30 of the light to the emblem texture plane 31 is constant as referred to FIG. 6, what represents the position of the emblem texture plane 31 in the global coordinate system and the size of the texture plane 31 etc. with determinants is created. The created projection matrix is outputted to the main storage device 3 and stored in it temporarily.

Next, the CPU 1 executes a process for creating a view matrix (Step S53). That is, the light matrix and the projection matrix created in Step S51 and S52 described above are read out from the main storage device 3 and the view matrix is created by multiplying the former by the latter. The created view matrix is outputted to the main storage device 3 and stored in it temporarily.

Next, the CPU 1 creates a depth matrix (Step S54). This is created by multiplying a matrix for the depth stored in the main storage device 3 in advance, by the light matrix created in Step S51. The created depth matrix is outputted to the main storage device 3 and stored in it temporarily.

Next, the CPU 1 creates a projection matrix from the current camera position (Step S55). The created projection matrix is outputted to the main storage device 3 and stored in it temporarily. Furthermore, the CPU 1 creates a camera matrix from the current camera position. The created camera matrix is outputted to the main storage device 3 and stored in it temporarily.

Next, the CUP 1 outputs a request for the start of drawing to the geometric processor 5 (Step S56). Thereby, the geometric processor 5 moves to the preparation for the process for drawing. In this case, the request is a request for the start of drawing for the process of so-called pre-rendering.

Next, the CPU 1 reads out the camera matrix created in Step S55 from the main storage device 3 (Step S57).

Next, the CPU 1 moves the object (model) to the position at which the object is desired to be displayed (Step S58). Specifically, similarly to the Step S14 for the process of drawing the object (see FIG. 2), both execute the process for calculating the position of the object when the camera position is the origin, from the position of the object represented in the global coordinate system and the camera position. Thereby, the relative position of the object from the viewpoint of the camera, i.e., the position of the object actually displayed on the screen of the display can be obtained.

Next, the CPU 1 transfers the model data (Step S59). Specifically, the CPU 1 outputs the model data indicating the relative position of the object calculated in Step S58 to the main storage device 3 and the data is stored in it temporarily.

Next, the CPU 1 outputs a request for the end of the drawing to the geometric processor 5 (Step S60). Then, the CPU 1 reads out the model data stored in the main storage device 3 and outputs the data to the geometric processor 5 and the process for drawing the object is executed (Step S60).

Next, the CPU 1 moves to the Step S62 shown in FIG. 10 and outputs instruction data to the geometric processor 5 for causing it to output the Z-value of the drawing result to the texture buffer 8. In this case, when the object is displayed on the screen of the display 9, though an arbitrary point on the screen (the relative position of the object from the camera position) is represented in a two (2)-dimensional coordinates, it is represented in three (3)-dimensional coordinates in the global coordinate system. Then, the CPU 1 outputs an instruction data such that the Z-value for the case where the object is represented in the global coordinate system for each arbitrary pixel on the screen, i.e., the value indicating the depth is stored in the texture buffer 8. The geometric processor 5 having received this instruction data calculates each Z-value and outputs those Z-values when it executes the calculation process for drawing the object. The Z-values are outputted to the texture buffer 8 from the display processor 7 through the display 9. Then, the Z-values are stored in the texture buffer 8.

Next, the CPU 1 outputs a request for the start of drawing for rendering to the geometric processor 5 (Step S63).

Next, the CPU 1 reads out the camera matrix stored in the main storage device 3 (Step S64) and calculates the relative position of the object from the camera position (Step S65). Specifically, similarly to Step S58, the CPU 1 executes the process for calculating the position of the object when the camera position is the origin from the object position and the camera position, both represented in the global coordinate system. Then, the CPU 1 outputs the calculated model data to the main storage device 3 (Step S66) and the model data is stored in the main storage device 3.

Next, the CPU 1 reads out the depth matrix created in Step S54 from the main storage device 3 (Step S67).

Next, the CPU 1 reads out an inclination texture stored in the main storage device 3 in advance and the depth matrix created in Step S54 from the main storage device 3 and creates a depth value. Here, the depth value is a value indicating the depth of a transparent model for which the α-value created in Step S39 for the projection process (see FIG. 4) is a predetermined value (for example, "0"). The created depth value is outputted to the main storage device 3 and is stored in it temporarily.

Next, the CPU 1 reads out the view matrix created in Step S53 and the Z-value created in Step S62 respectively from the main storage device 3 and the texture buffer 8 (Step S69).

Next, the CPU 1 compares the depth value created in Step S68 and the Z-value read out in Step S69 (Step S70). The depth value indicates the depth of the model created by the calculation and the Z-value indicates the depth of the model actually displayed. By comparing these with each other, which one of them is located closer from the screen is determined. For example, if the Z-value is larger than the other, the transparent model is painted in white and, if it is not, the model is painted in black.

Next, the CPU 1 controls the main storage device 3 and the texture buffer 8 such that the data of the emblem stored in the main storage device 3 is duplicated in the texture buffer 8 (Step S71). Therefore, the model data for displaying the emblem created by the user is stored in the main storage device 3 and the texture buffer 8.

Next, the CPU 1 creates emblem texture coordinates (Step S72). Similarly to the projection process (see FIG. 4), the coordinates of the emblem are changed in this creation such that the created emblem is pasted on each of the polygon planes of the object. This creation of the texture coordinates is executed using the view matrix created in Step S53 and the three (3)-dimensional coordinates of the object. The emblem is represented with two (2)-dimensional coordinates (in so-called u-v coordinate system) on the texture plane 31. However, since the coordinates of each apex forming the polygons of the object are three (3)-dimensional coordinates, the texture coordinates to be created are represented as three (3)-dimensional coordinates. Since such texture coordinates are coordinates converted into the coordinates of the object, an image in which the emblem created by the user is pasted on the character can be displayed.

Next, the CPU 1 creates a matrix for fading out (Step S73). When an emblem is pasted on a character, there are cases where some lines constituting the emblem are not constant straight lines or curves but are repetition of a shape having acute angles depending on, for example, the position of the light. Then, the matrix for fading out is a created for a process for hiding such shapes in the object. The data for creating this matrix for fading out is stored in the main storage device 3 in advance and this matrix is created from reading out of the data using the CPU 1.

Figure 11:
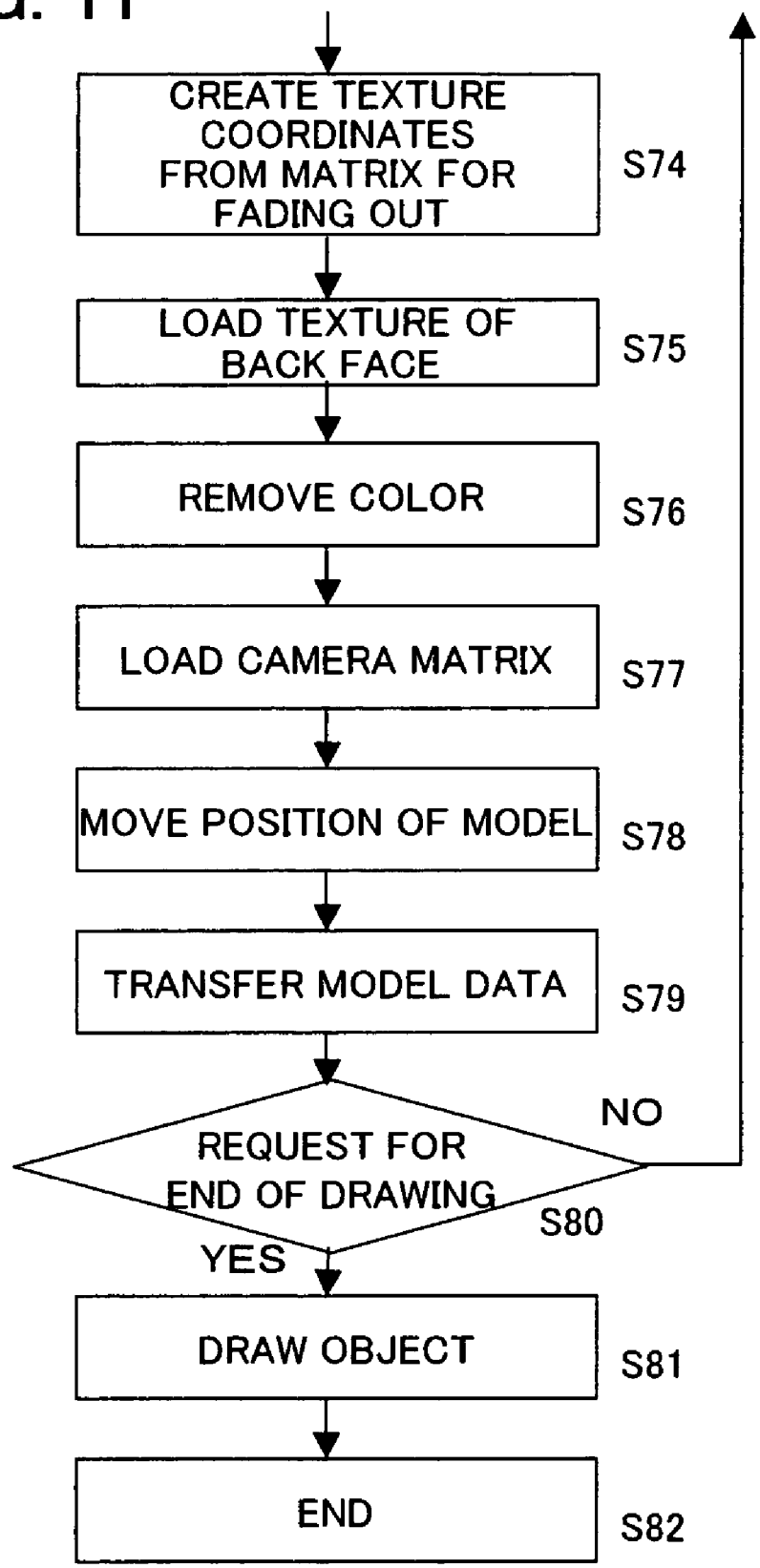
FIG. 11 is a flowchart showing the process of the entire representation in a game.

Next, the CPU 1 moves to Step S74 in FIG. 11 and creates the texture coordinates from the matrix for fading out. Specifically, the coordinates for fading out are created from the matrix for fading out created in Step S73 described above and the normal vectors to the polygon planes of each object.

Next, the CPU 1 reads out the texture of the back face from the main storage device 3 (Step S75). Back faces are the objects for the part being not able to be seen on the screen of the display 9 among the objects. The texture of such back faces is stored in the main storage device 3 in advance.

Next, the CPU 1 executes a process for removing colors (Step S76). Removal of colors is executed by setting the α-value to a predetermined value or to black for the back face texture read out in Step S75 as described above.

Next, the CPU 1 reads out the camera matrix stored in the main storage device 3 in order to calculate the camera position against the transparent model (Step S77). Then, the CPU 1 calculates the relative position of the object from the camera position, based on the camera matrix read out (Step S78). The calculated position of the object is outputted temporarily to the main storage device 3 and stored in it temporarily (Step S79).

Next, the CPU 1 outputs a request for ending the drawing to the geometric processor 5 when the process for one (1) frame has been ended (in the case of "Yes" in Step S80). When the process for one (1) frame has not been ended (in the case of "No" in Step S80), the process moves again to Step S63 and the above steps are repeated.

When the request for ending the drawing has been outputted, the CPU 1 moves its process to Step S81 and executes the process for drawing the object (Step S81). Specifically, the CPU 1 reads out the model data stored in the main storage device 3 in Step S59, Step S66 and Step S79, outputs them to the geometric processor 5 and executes calculation for drawing the entire image containing the objects with the emblems actually pasted on them.

The calculated data is outputted from the display processor 7 to the display 9 and is actually displayed on the display 9. Thereby, it is possible to display an image of one (1) frame containing the character 16 with the emblem pasted on it while the game is actually being played. Then, it is possible to display consecutive images by repeating the process described above.

Figure 12:
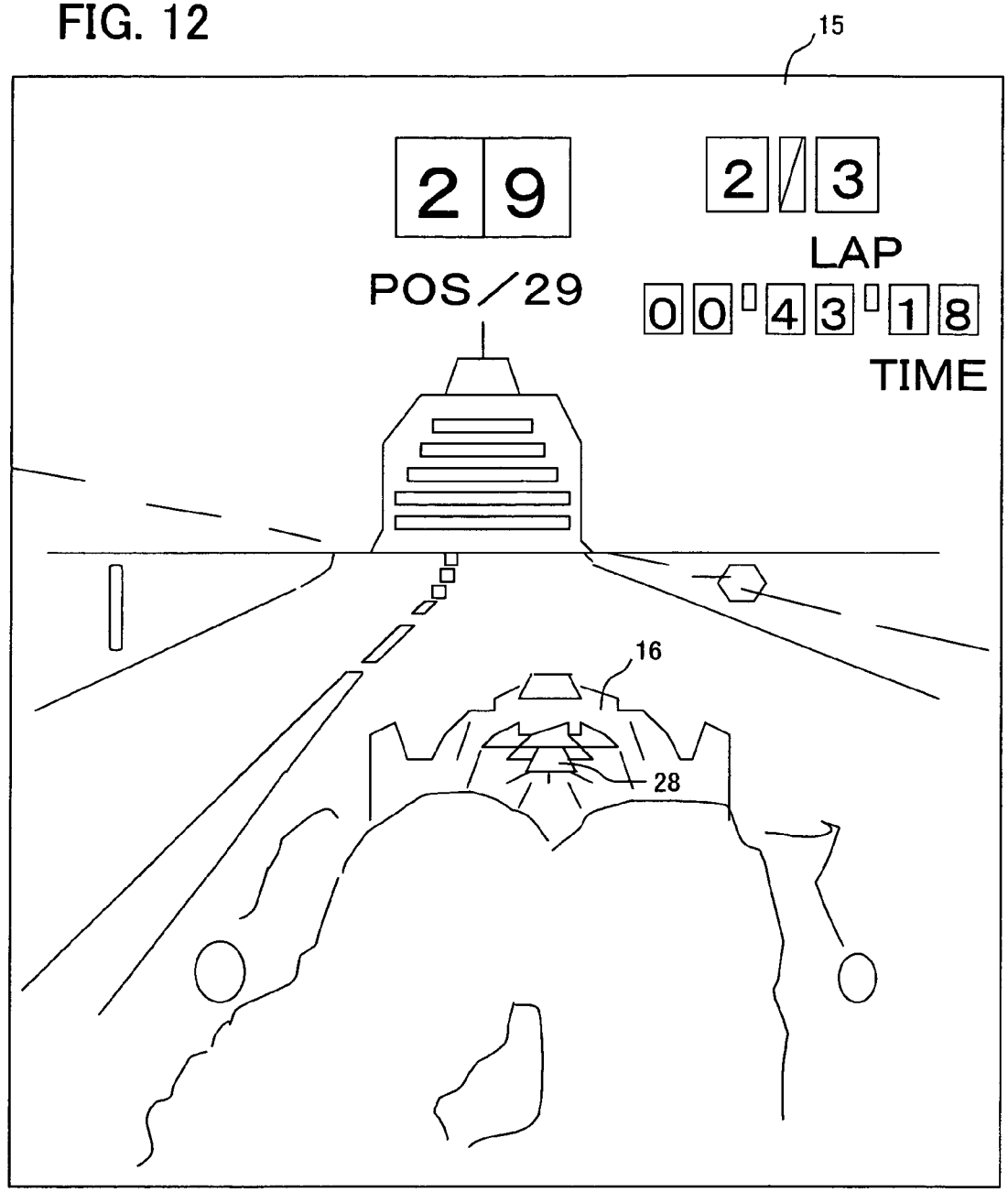
FIG. 12 shows an example of screen display when a game is being executed.

An example of a screen displayed on the display is shown in FIG. 12. In the screen 15, the character (object) 16 which the user operates is positioned and the emblem 28 described above is positioned as if it was actually pasted on the back face of the character 16.

Next, the image of the emblem created by the user is pasted on the front face and the back face of each plane of the object 16. This will be described referring to FIGS. 13-19 relating to the operation for pasting the emblem only on the projection plane closest to the viewpoint.

This process is executed by the geometric processor 5 (see FIG. 10) having received the control signal of the CPU 1 in Step S72 and Step S73 in the display process while the game is being played as described above (see FIGS. 9-11).

Figure 13A:
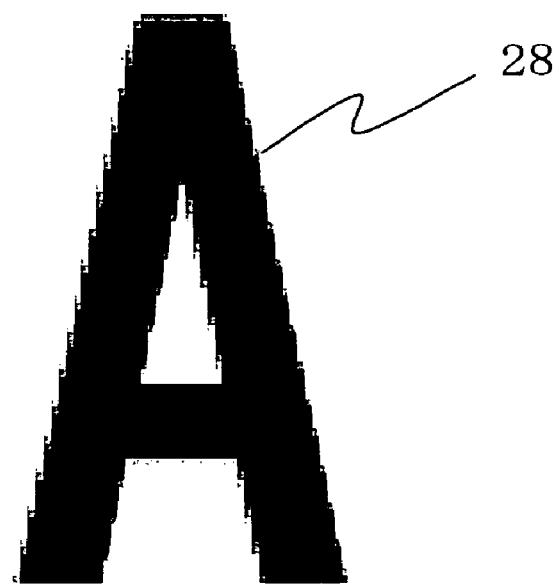
FIGS. 13A and 13B show an example of an emblem to be pasted to an object 16.
Figure 13B:
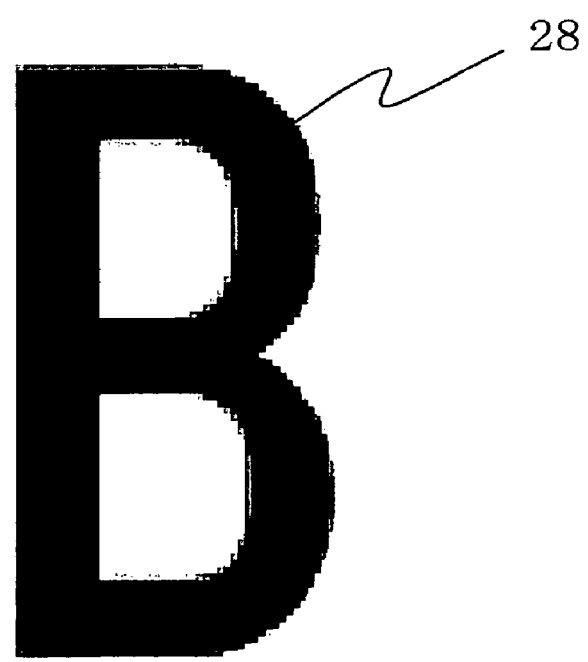

First, as shown in FIG. 13A, a case will be described, where an emblem, a letter "A" is created in, for example, the emblem creation screen shown in FIG. 5.

Here, assuming that arbitrary position coordinates in a three (3)-dimensional coordinate system (global coordinate system) are (x, y, z, 1), the coordinates in a texture space where the emblem is present are (s, t, 1), the determinant for mapping (texture mapping) the coordinates of this position in the three (3)-dimensional system (x, y, z, 1) into coordinates (s, t, 1) in the texture space is represented as follows.

[Equation 1] (1)

$$\begin{bmatrix} 2*scaleS/(r-l) & 0.0 & -scaleS*(r+l)/(r-l)+transS & 0.0 \\ 0.0 & 2*scaleT/(t-b) & -scaleT*(t+b)/(t-b)+transT & 0.0 \\ 0.0 & 0.0 & 0.0 & 1.0 \\ 0.0 & 0.0 & 0.0 & 1.0 \end{bmatrix}$$

Figure 14:
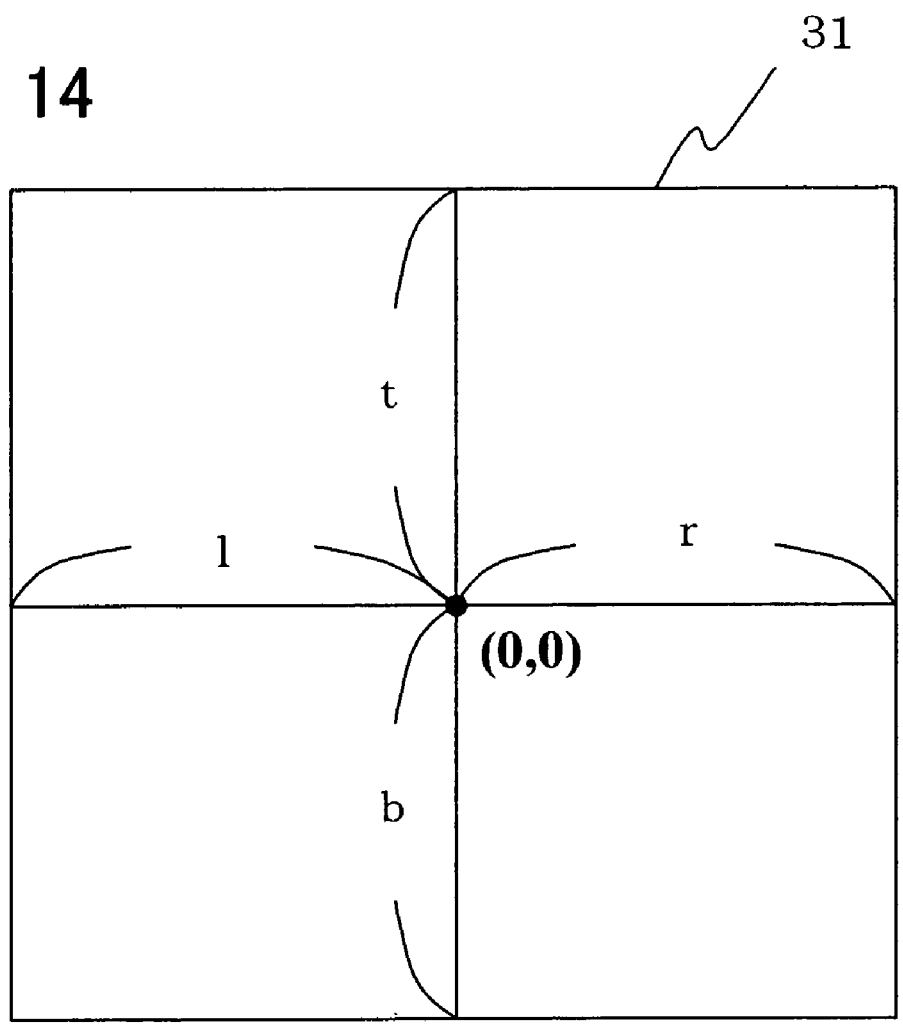
FIG. 14 shows an example of a texture plane 31.
Figure 15A:
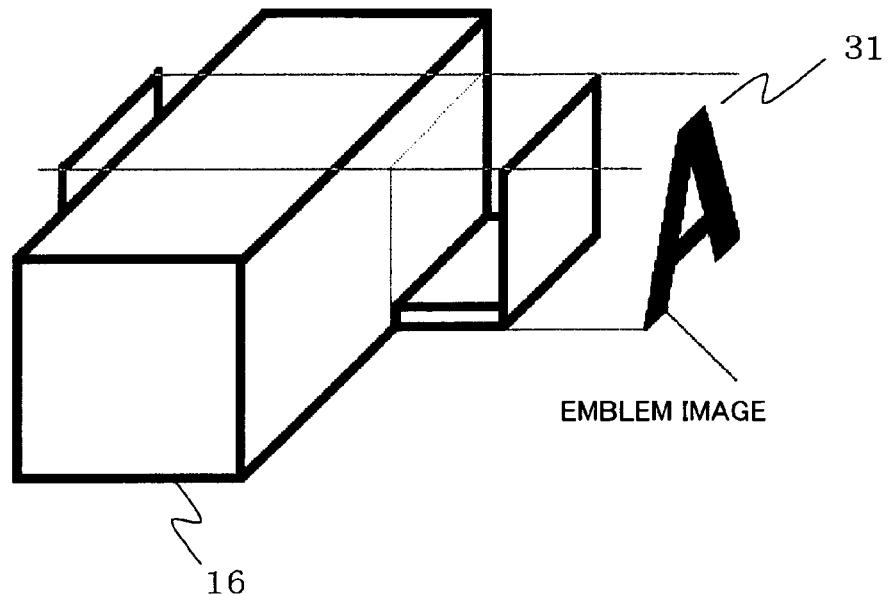

Here, "t", "b", "l" and "r" are parameters for representing the size of the texture plane 31 and respectively represent the upward length (top), the downward length (bottom), the length toward right (left) and the length toward left (right) from the origin. This relation is shown in FIG. 14. Here, FIG. 15A is a screen showing the relation between the emblem and the object 16. The texture plane 31 is present against the object 16 as shown in the figure and the emblem "A" is positioned created in advance is present on the plane. Here, the four (4) parameters indicating the size of the texture plane 31 indicates the size of the plane 31 in the texture space.

In addition, "scaleS" and "scaleT" are parameters for adjusting the size of the emblem when the emblem created on the texture plane 31 is positioned in the three (3)-dimensional space coordinate system where the object 16 is positioned. They are respectively for adjusting the size of the vertical direction and the horizontal direction. Thereby, the size of the emblem created on the texture plane 31 can be adjusted in the three (3)-dimensional space coordinate system. Describing this referring to FIG. 15A, the size of the emblem in the three (3)-dimensional coordinate space when the emblem "A" is pasted on the object 16 can be adjusted.

Figure 15B:
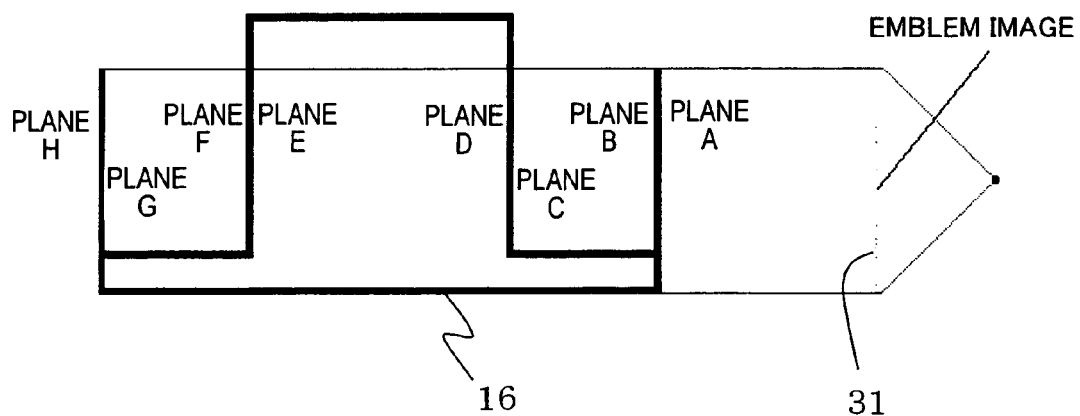
FIG. 15B is a side view showing the above relation.

Furthermore, "transS" and "transT" are parameters for correcting the displacement between the origin of the texture plane 31 and the origin of the three (3)-dimensional space coordinate system. They respectively indicate the horizontal direction and the vertical direction. The origin of the texture plane 31 is, for example, the position of (0, 0) in FIG. 14 and not necessarily coincides with the position of the origin of the three (3)-dimensional space coordinate system. FIG. 15B shows a cross-sectional view when the tip of the object 16 comes frontward compared to the FIG. 15A. In FIG. 15A, when the position of the center of the texture plane 31 is taken as the origin of the texture space, if the origin of the three (3)-dimensional space coordinate system is not present at this position, the emblem can not be positioned on the plane A (the wing portion of the object 16) in FIG. 15B when the emblem is pasted in the three (3)-dimensional space coordinate system. The displacement between the positions of the origins of both of the coordinate systems can be corrected by adjusting these two parameters.

In the determinant (1), assuming that, for example, t=−1.0, b=1.0, l=−1.0, r=1.0 (the size of the texture plane in the texture space has a size of "1" from the origin), scaleS=0.5, scaleT=0.5 (the size of the texture plane in the three (3)-dimensional space coordinate system is a half of that in the texture space coordinate system), transS=0.5, transT=0.5. (the size of the texture plane in the three (3)-dimensional space coordinate system is a half of that in the texture space coordinate system) and transS=0.5, transT=0.5 (the position displaced from the position of the origin of the texture plane by 0.5 respectively vertically and horizontally is the origin of the three (3)-dimensional space coordinate system), the determinant (1) is represented as follows.

[Equation 2]   (2)

$$\begin{bmatrix} 0.5 & 0.0 & 0.5 & 0.0 \\ 0.0 & 0.5 & 0.5 & 0.0 \\ 0.0 & 0.0 & 0.0 & 1.0 \\ 0.0 & 0.0 & 0.0 & 1.0 \end{bmatrix}$$

From this determinant (2), an arbitrary position (s, t, 1, 1) in the texture space coordinate system for an arbitrary position (x, y, z, 1) in the three (3)-dimensional space coordinate system is described as follows.

[Equation 3]

$$s=0.5*x+0.5, t=0.5*y+0.5 \quad (3)$$

Figure 16A:
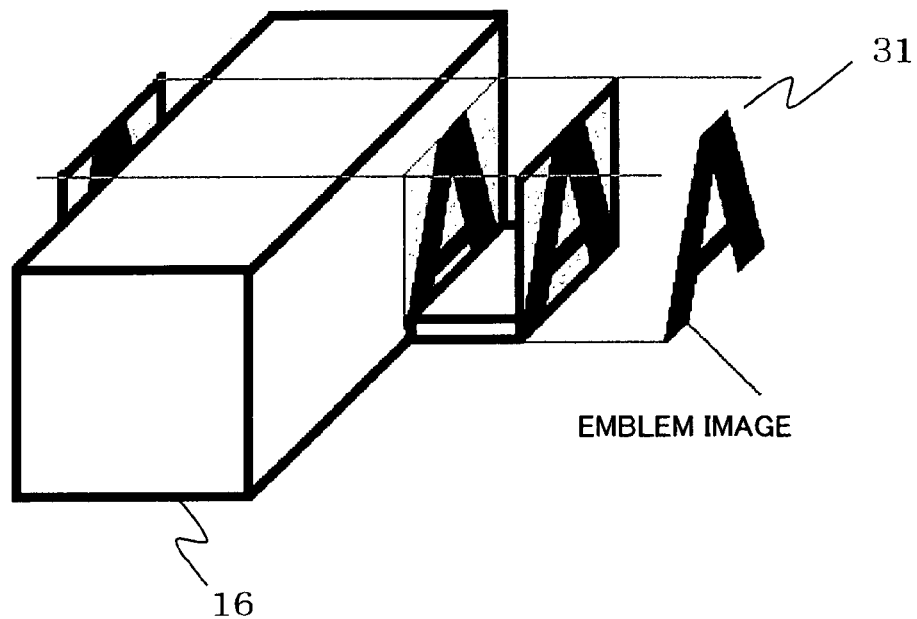
Figure 16B:
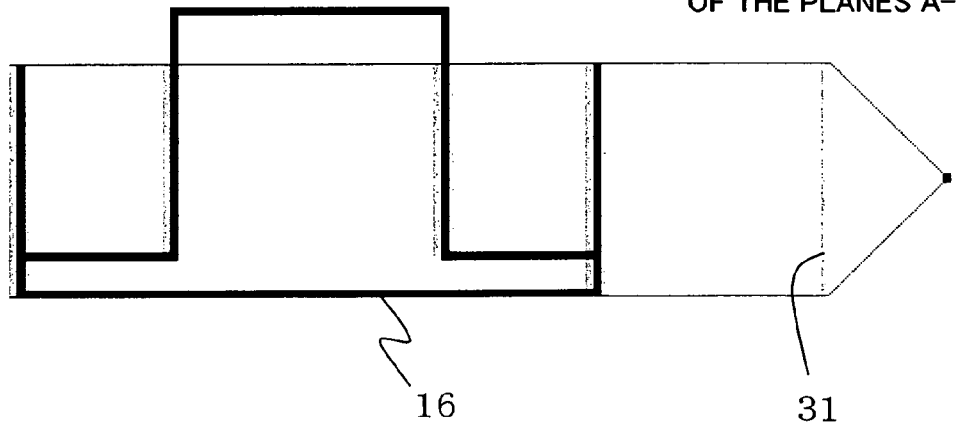
FIG. 16B is a side view showing the above relation.

These two equations (3) indicates that same texture coordinates are mapped for a point in the three (3)-dimensional space coordinate system having x and y being same as each other. That is, for a point having x and y being as each other in the three (3)-dimensional space coordinate system, a point having the same texture coordinates is positioned in the three (3)-dimensional coordinate system even when the value of z indicating the depth in this three (3)-dimensional space coordinate system takes any value. Describing this using a figure, a plane A to a plane H are present for each part for the object 16 as shown in 15B. The wing part of the object 16 consists of two planes of a plane A and a plane B. In this case, even when any value is taken as the value of z being the depth, the same texture plane is mapped if the x and y are equal to each other. Therefore, as shown in FIG. 16A, the emblem "A" created on the texture plane 31 is pasted on the all the planes of a plane B, a plane C, a plane D, a plane E, a plane F, a plane G and a plane H towards the depth of the object 16 in addition to the plane A (see also FIG. 16B).

According to the present invention, a process is executed at the geometric processor 5 (see FIG. 1) such that the emblem pasted on all the planes as described above is pasted only on the plane closest to the viewpoint. First, a determinant as follows is considered in order to map a normal line (x, y, z, 1) in the three (3)-dimensional space into the texture space (s, t, 1, 1).

[Equation 4]   (4)

$$\begin{bmatrix} 0.0 & 0.0 & 0.5 & 0.5 \\ 0.0 & 0.0 & 0.0 & 0.0 \\ 0.0 & 0.0 & 0.0 & 1.0 \\ 0.0 & 0.0 & 0.0 & 1.0 \end{bmatrix}$$

In this case, s and t are obtained as follows.

[Equation 5]

$$s=0.5*z+0.5, t=0 \quad (5)$$

That is an arbitrary point s in the horizontal direction in the texture space does not depend on t even when t takes any value. Furthermore, s=10 when the z component is "1" (depth) in the three (3)-dimensional coordinate system and s=0.0 when the z component is "−1". That is, the value of s is "1.0" when the normal line is in the direction of the viewpoint and the value of s is "0.0" when the normal line is in the opposite direction against the viewpoint, and, by taking such a value as the α-value (transparency degree) of texture blending, the transparency degree of the emblem pasted on the planes (the plane B, the plane D, the plane F and the plane H in FIG. 16B) in the opposite direction against the viewpoint is set to "0".

Figure 17:
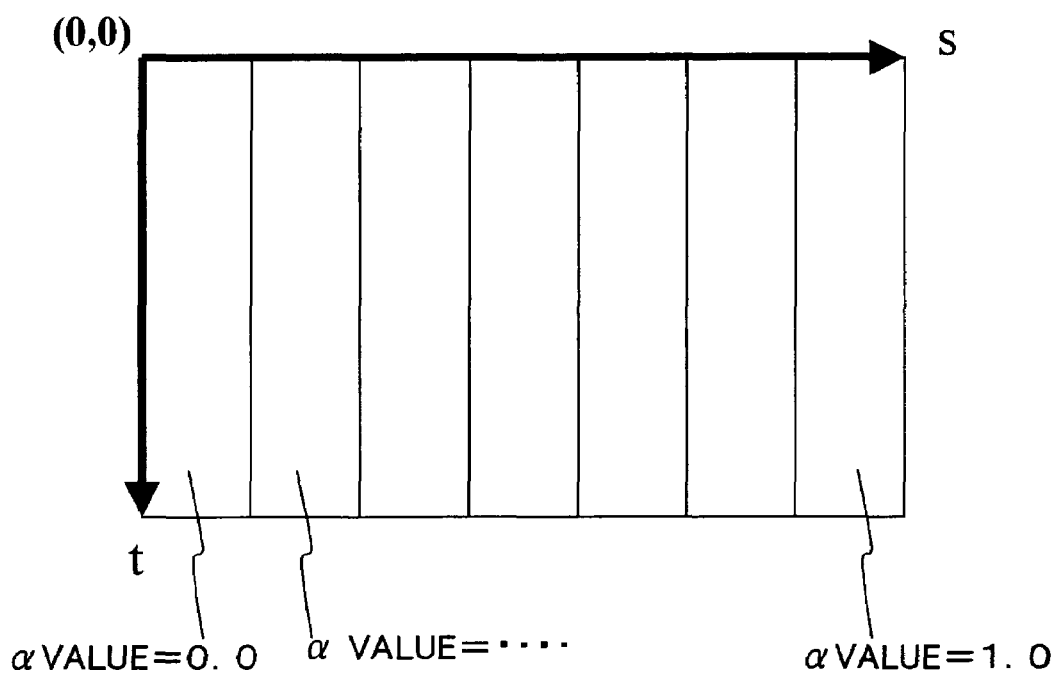
FIG. 17 shows an example of a texture having an α value.
Figure 18A:
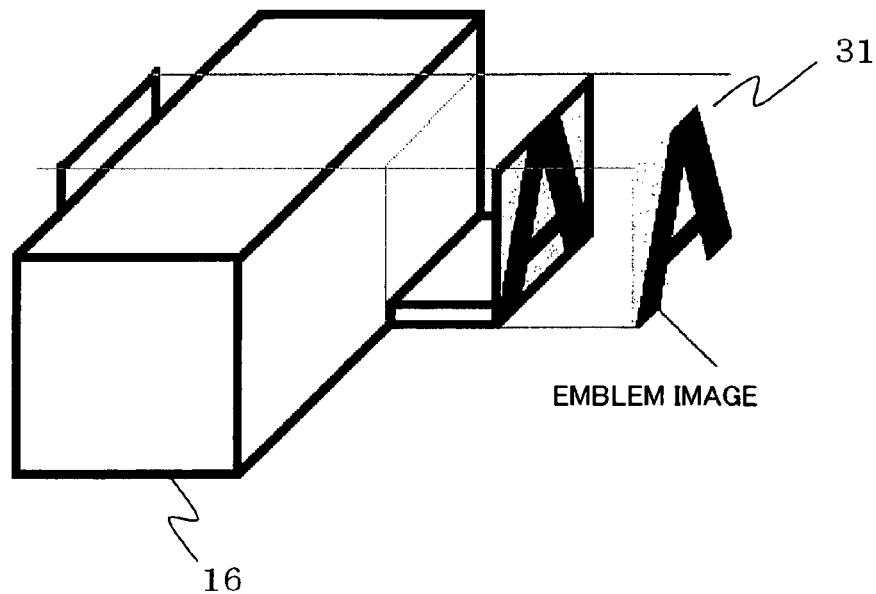
Figure 18B:
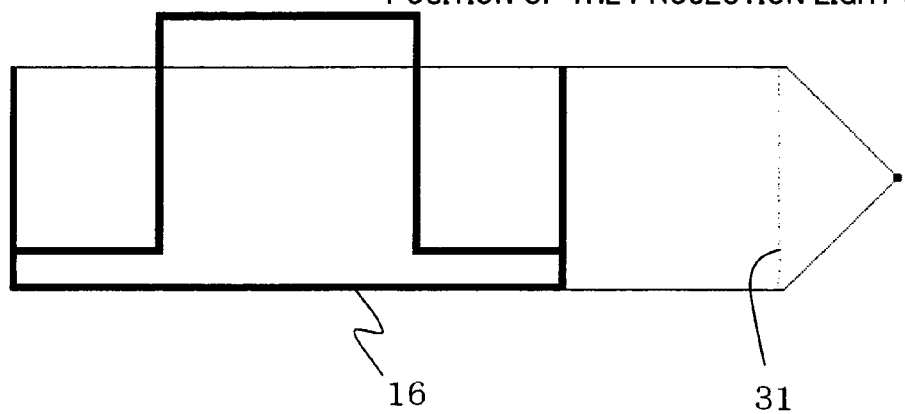
FIG. 18B is a side view showing the above relation.

Describing this referring to FIG. 17, this FIG. 17 shows an arbitrary point in the texture space, the value of s does not depend on the value of t as indicated by Equation (5) and a texture is prepared, which is different from the texture plane where the emblem for which an arbitrary point in each texture space takes the α-value has been created. The texture may be, for example, stored in advance in the main storage device 3 in FIG. 1 or stored in the storage medium 4. This texture is arranged such that the α-value approaches to 0 as the value of s becomes smaller, in other words, the texture becomes transparent gradually as the value of s becomes smaller. Therefore, the emblem pasted on the back face (the plane B, the plane D, the plane F, the plane H) of the object 16 is made transparent by setting the transparency degree to "0" (invisible) when the value of s is "0".

Figure 19A:
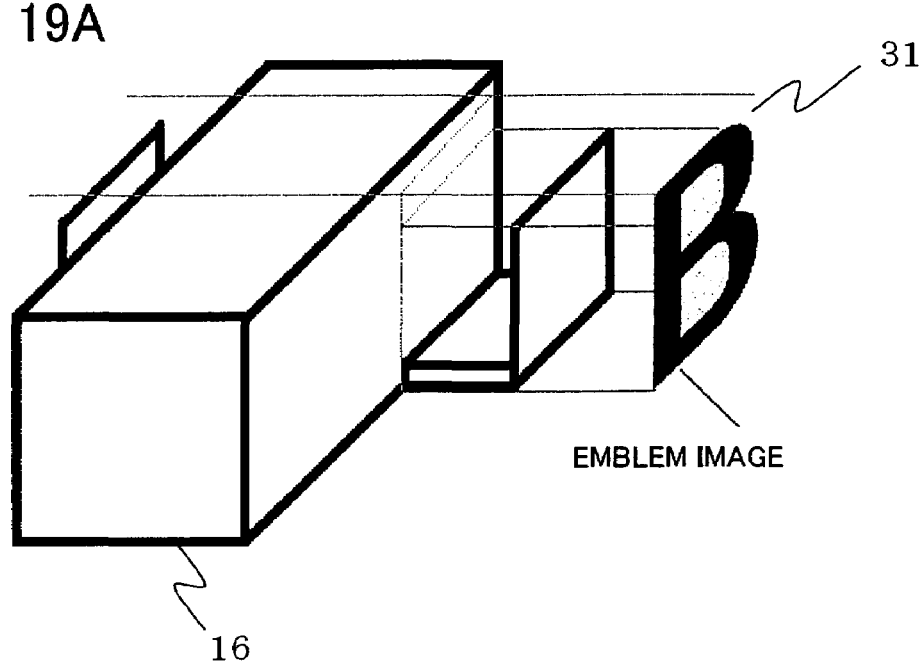
Figure 19B:
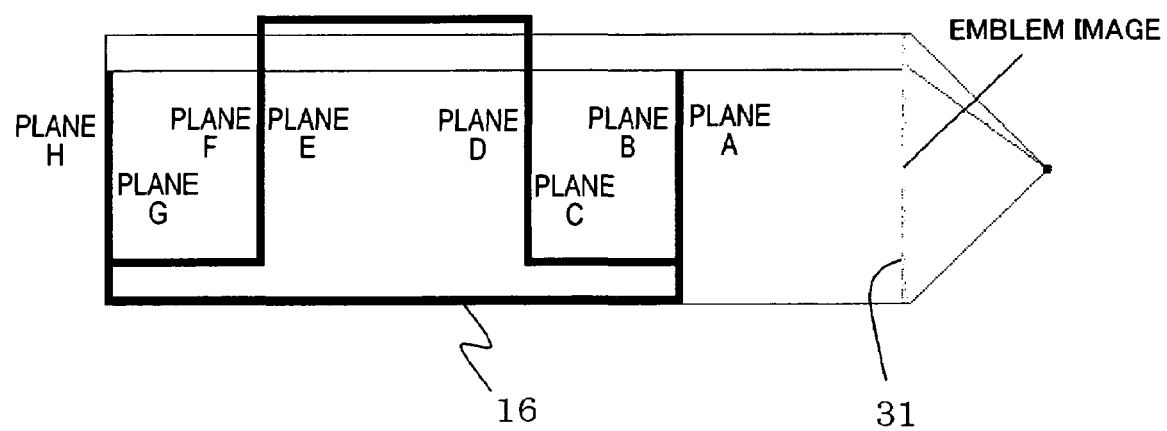
FIG. 19B is a side view showing the above relation.

Next, the geometric processor 5 causes the emblem on the plane A being closest to the viewpoint to remain among the emblems pasted on the plane A, the plane C, the plane E, the plane G of the object 16. Therefore, the geometric processor 5 determines the plane being closest to the viewpoint by comparing the α-values between each plane. Therefore, as shown in FIG. 19A and 19B, the emblem "A" is pasted on the wing part of the object 16 being closest to the viewpoint.

Figure 20A:
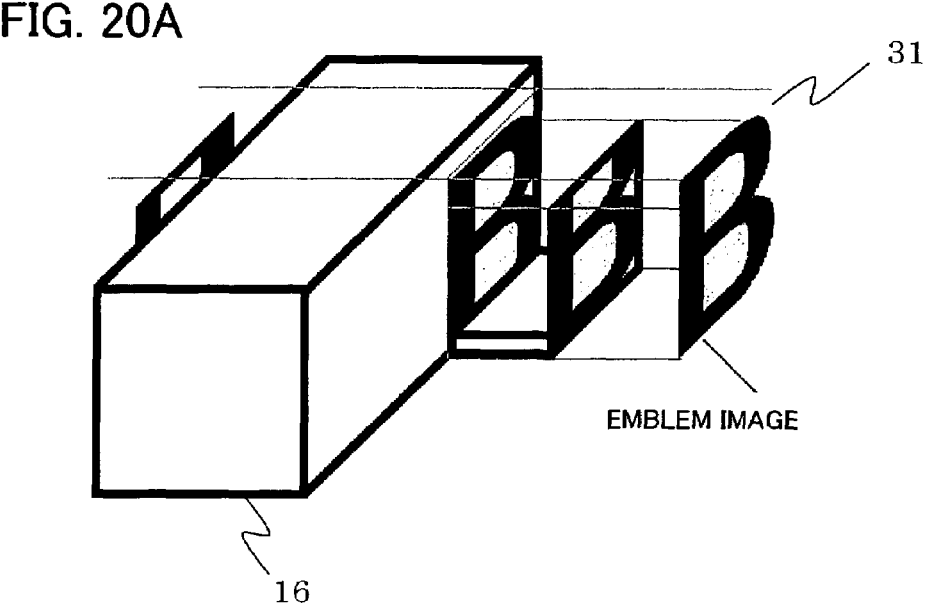
Figure 20B:
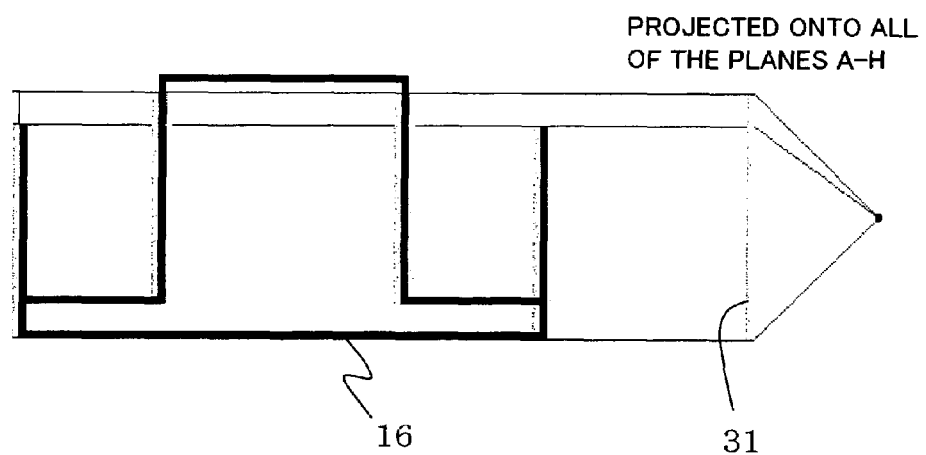
FIG. 20B is a side view showing the above relation.
Figure 21A:
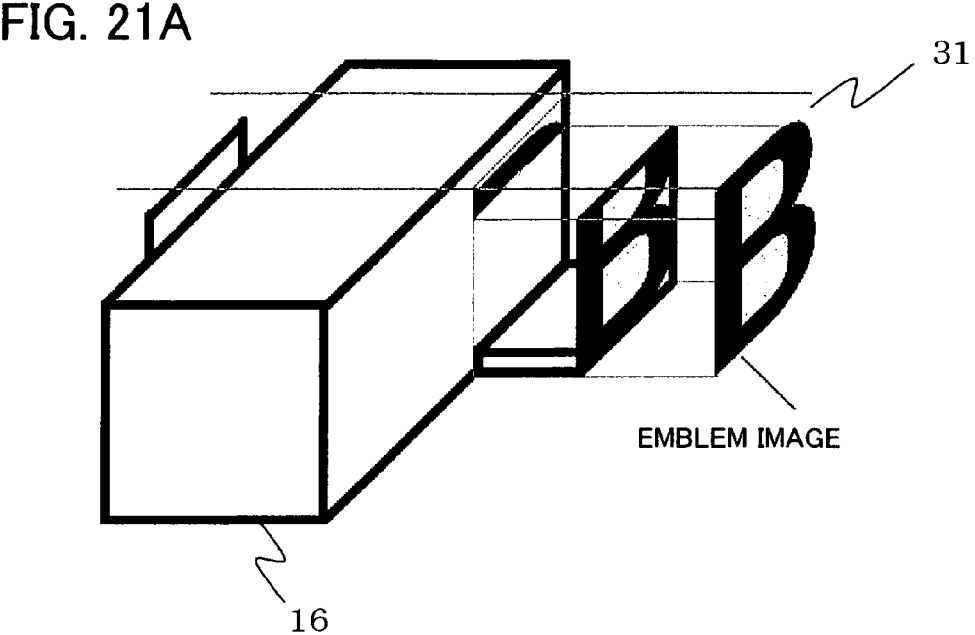
Figure 21B:
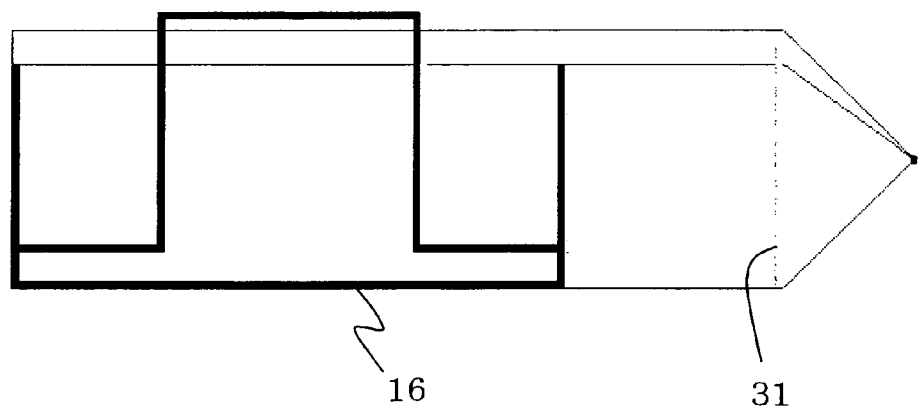
FIG. 21B is a side view showing the above relation.

As to the comparison of the α-values, the closest plane is determined by comparing them for each pixel constituting the object 16. That is, as shown in FIG. 19A, the case is taken for consideration, where the emblem "B" created in the texture plane 31 is positioned partially extruding from the wing part of the object 16. In this case, as shown in FIGS. 20A and 20B, the emblem "B" is also pasted on each plane (the planes A-H) and these pasted emblems are made invisible by mapping the texture having the transparency degree of "0" to the emblems positioned on the back face (the plane B, the plane D, the plane F and the plane H). Then, the emblem "B" is pasted on the plane closest by the α-value. However, as shown in FIGS. 21A and 21B, when these α-values are compared for each pixel, the body part of the object 16 on which the emblem "B" is pasted partially extruding from it is positioned at the closest position when the α-values are compared for each pixel from the upper part of the texture plane 31. Therefore, the emblem partially extruding is pasted at a position in the object closest to the viewpoint.

What is claimed is:

1. A program for projecting a predetermined image onto a character of a game in a game wherein the character is characterized by a plurality of polygon planes, machine having an operation unit for executing predetermined operation in a screen, a calculation processing unit for executing predetermined calculation, and a control unit connected with the operation unit and the calculation processing unit and for controlling the calculation processing unit, the program encoded in computer readable medium and configured to be executed by the game machine, the program comprising:

an image creation process which creates an image consisting of two-dimensional coordinates with the control unit by operating the operation unit; and a pasting process which arranges the image created by the image creation process and a virtual light source for projecting the image onto the character at an arbitrary position in the vicinity of the character in a three-dimensional virtual space, based on an input signal from the operation unit, and for pasting on the character a projected image created by projecting the image onto the character from the projected virtual light source, wherein the pasting process pastes on the character the projected image such that the projected image projected on only a polygon plane of the plurality of polygon planes closest to the virtual light source remains after the character is pasted on all of the plurality of polygon planes from the virtual light source by a projecting process using a light matrix, a view matrix, and a projection matrix; and the pasting process creates the view matrix using the light matrix and the projection matrix.

2. The program according to claim 1, wherein the character is constituted by a combination of a plurality of parts;

at least one of the parts is designated as a projection target in response to the operation of the operation unit; and the pasting process pastes the projected image to the designated part by the control unit.

3. A game machine having an operation unit for executing a predetermined operation in a screen, calculation processing unit for executing a predetermined calculation, and control unit connected with the operation unit and the calculation processing unit and for controlling the calculation processing unit, the game machine for projecting a predetermined image onto a character of a game wherein the character is characterized by a plurality of polygon planes, comprising:

an image creation unit which creates an image consisting of two-dimensional coordinates with the control means by operating the operation means; and a pasting unit which arranges the image created by the image creation unit and a virtual light source for projecting the image onto the character at an arbitrary position in the vicinity of the character in a three-dimensional virtual space, based on an input signal from the operation unit, and pastes on the character a projected image created by projecting the image onto the character from the projected virtual light source, wherein the pasting unit pastes on the character the projected image such that the projected image projected on only a polygon plane of the plurality of polygon planes closest to the virtual light source remains after the character is pasted on all of the plurality of ploygon planes from the virtual light source by a projecting unit using a light matrix, a view matrix, and a projection matrix; and the pasting unit creates the view matrix using the light matrix and the projection matrix.

4. The game machine according to claim 3, wherein the character is constituted by a combination of a plurality of parts;

at least one of the parts is designated as a projection target in response to the operation of the operation unit; and the pasting unit pastes the projected image to the designated part by the control unit.

5. An image display control program for operating a computer as image data creation unit for creating image data for displaying on a display device an object image created by projecting a predetermined projection image onto an object characterized by a plurality of polygon planes and consisting of three-dimensional coordinates in a three-dimensional virtual space, the image display control program being in a computer readable medium and configured to be executed by a control unit of the computer, the image display control program comprising:

creating predetermined projection image data to be projected onto the object;

arranging the object and the projection image in the virtual space;

determining, based on operation of an operator, the relative position of the projection image to the object and the position of a virtual light source which projects the projection image onto the object;

calculating the distance between the virtual light source and a projection plane containing the projection position on the object, and calculating the plurality of polygon plane of the object onto which the projection image is projected, removing from the projection image a polygon plane beyond a predetermined distance from the virtual light source after the object is pasted on all of the plurality of polygon planes from the virtual light source on which the projected image is projected by a projecting process using a light matrix, a view matrix, and a projection matrix;

projecting the projection image onto the projection plane with the virtual light source as a viewpoint, and pasting the projection image to the projection plane of the object, the projecting process pastes on the characters the projected image such that the projected image projected on only a polygon plane of the plurality of polygon planes closest to the virtual light source remains; and creating object image data for the object to which the projection image is pasted, wherein the view matrix is created using the light matrix and the projection matrix.

6. The image display control program according to claim 5, further comprising:

creating image data of the projection image by the control unit, based on a operation signal inputted from an operating unit by a user.

7. The image display control program of claim 6, further comprising:

changing the transparency degree of the projection object depending on the determination of the relation between the positions of the virtual light source, the projection object and the object resulting from the projection image pasted to the object.

8. The image display control program of claim 6, wherein the object consists of a combination of a plurality of parts, and further comprising:

designating at least one of the parts as a projection target of the projection image in response to operation of an operator, and pasting the projection image to the designated part(s).

9. The image display control program according to claim 7 further comprising:

projecting the projection image onto a transparent object having a same or an approximately same shape as that of the object and pasting the projection image to the transparent object, by the control unit; and causing the display device to display the transparent object to which the projection image is pasted, in such a manner as to be superimposed on the object, by the control unit.

10. The image display control program of claim 9, further comprising:

changing the transparency degree of the projection object depending on the determination of the relation between the positions of the virtual light source, the projection object and the object resulting from the projection image pasted to the object.

11. The image display control program of claim 9, wherein the object consists of a combination of plurality of parts, and further comprising:

designating at least one of the parts as a projection target of the projection image in response to operation of an operator, and pasting the projection image to the designated part(s).

12. The image display control program of claim 5, further comprising:

the program is operable to effect a function of changing the transparency degree of the projection object depending on the determination of the relation between the positions of the virtual light source, the projection object and the object that deformation of projection image pasted to the object by the control unit.

13. The image display control program of claim 12, wherein the object consists of a combination of a plurality of parts, and further comprising:

designating at least one of the parts as a projection target of the projection image in response to operation of an operator, and pasting the projection image to the designated part(s).

14. The image display control program of claim 5, further comprising:

the object consists of a combination of a plurality of parts, and wherein least one of the parts as a projection target of the projection image in response to operation of an operator, and pasting the projection image to the designated part(s).

15. An image display control program for operating a computer as image data creation unit for creating image data for displaying on a display device an object image created by projecting a predetermined projection image onto an object characterized by a plurality of polygon planes and consisting of three-dimensional coordinates in a three-dimensional virtual space, the image display control program being encoded in computer readable medium and configured to be executed by the computer, the image display control program comprising:

creating predetermined projection image data to be projected onto the object;

arranging the object and the projection image in the virtual space;

determining, based on operation of an operator, the relative position of the projection image to the object and the position of a virtual light source which projects the projection image onto the object;

calculating for each pixel of the projection image, respectively, the distance between the virtual light source and a projection plane containing the projection position on the object, projecting with the virtual light source as a viewpoint the pixels of the projection image onto the pixels of a polygon plane of the plurality of polygon planes closest to the viewpoint, and pasting the projection image onto said polygon plane after object is pasted on all of the plurality of polygon planes on which the project image is projected by the projecting process using a light matrix, a view matrix, and a projection matrix, the calculating process pastes on the object the projected image such that the projected image projected on only said polygon plane closest to the virtual light source remains; and creating object image data for the object to which the projection image is pasted, wherein the view matrix is created using the light matrix and the projection matrix.

* * * * *

UNITED STATES PATENT AND TRADEMARK OFFICE
CERTIFICATE OF CORRECTION

PATENT NO. : 7,485,041 B2
APPLICATION NO. : 10/760482
DATED : February 3, 2009
INVENTOR(S) : Shoji Katsuragawa et al.

It is certified that error appears in the above-identified patent and that said Letters Patent is hereby corrected as shown below:

Title Page;

In Section (73):

Please insert --Nintendo Co., Ltd., Kyoto (JP)-- after "Sega Corporation, Tokyo (JP)".

Signed and Sealed this

Fourteenth Day of July, 2009

JOHN DOLL
*Acting Director of the United States Patent and Trademark Office*